US011916827B2

(12) United States Patent
Park et al.

(10) Patent No.: US 11,916,827 B2
(45) Date of Patent: Feb. 27, 2024

(54) METHOD AND APPARATUS FOR TRANSMITTING/RECEIVING POSITIONING REFERENCE SIGNAL

(71) Applicant: Innovative Technology Lab Co., Ltd., Seoul (KR)

(72) Inventors: Dong Hyun Park, Seoul (KR); Sung Jun Yoon, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 0 days.

(21) Appl. No.: 17/903,031

(22) Filed: Sep. 5, 2022

(65) Prior Publication Data
US 2023/0015433 A1 Jan. 19, 2023

Related U.S. Application Data

(63) Continuation of application No. 16/901,131, filed on Jun. 15, 2020, now Pat. No. 11,469,868, which is a (Continued)

(30) Foreign Application Priority Data

Aug. 12, 2016 (KR) .................. 10-2016-0103209
Sep. 30, 2016 (KR) .................. 10-2016-0126856

(51) Int. Cl.
*H04L 5/00* (2006.01)
*H04J 11/00* (2006.01)
(Continued)

(52) U.S. Cl.
CPC ........ *H04L 5/0048* (2013.01); *H04J 11/0079* (2013.01); *H04L 5/005* (2013.01);
(Continued)

(58) Field of Classification Search
CPC ..... H04W 64/00; H04W 64/003; H04W 4/02; H04W 72/0446; H04L 5/0048;
(Continued)

(56) References Cited

U.S. PATENT DOCUMENTS

2013/0194931 A1\* 8/2013 Lee .................. H04L 5/0053
370/329
2015/0018010 A1 1/2015 Fischer
(Continued)

FOREIGN PATENT DOCUMENTS

CN 102356574 A 2/2012
CN 102461292 A 5/2012
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, Jun. 2016, pp. 1-170, 3GPP.
(Continued)

*Primary Examiner* — Margaret G Mastrodonato

(57) ABSTRACT

An apparatus and method for processing positioning reference signal are disclosed. A method may include receiving, by a narrow-band (NB) user equipment (UE), positioning reference signal (PRS) configuration information, determining, by the NB UE, narrowband PRS (NB PRS) configuration information for the NB UE, the NB PRS configuration information comprising information of an NB PRS reference cell that generates an NB PRS for the NB UE, determining, by the NB UE, PRS configuration information for a UE, the UE being assigned to use a frequency band unavailable for the NB UE, and the PRS configuration information comprising information of a PRS reference cell that generates a PRS for the UE, generating, based on the NB PRS configuration information and the PRS configuration information, a
(Continued)

reference signal time difference (RSTD) measurement, and transmitting, by the NB UE, the RSTD measurement.

17 Claims, 30 Drawing Sheets

Related U.S. Application Data continuation of application No. 16/664,170, filed on Oct. 25, 2019, now Pat. No. 10,700,835, which is a continuation of application No. 16/277,983, filed on Feb. 15, 2019, now Pat. No. 10,511,426, which is a continuation of application No. 15/673,840, filed on Aug. 10, 2017, now Pat. No. 10,256,957.

(51) Int. Cl.
  *H04L 27/26* (2006.01)
  *H04W 72/30* (2023.01)
  *H04W 72/0446* (2023.01)

(52) U.S. Cl.
  CPC ........ *H04L 5/0053* (2013.01); *H04L 27/2613* (2013.01); *H04W 72/30* (2023.01); *H04L 5/0007* (2013.01); *H04L 27/2655* (2013.01); *H04L 27/26132* (2021.01); *H04W 72/0446* (2013.01)

(58) Field of Classification Search
  CPC ..... H04L 5/005; H04L 5/0007; H04L 5/0053; H04L 27/2613; H04L 5/0073
  See application file for complete search history.

(56) References Cited

U.S. PATENT DOCUMENTS

| | | | |
|---|---|---|---|
| 2016/0095095 A1* | 3/2016 | Lorca Hernando | .... H04J 11/005 370/329 |
| 2017/0238298 A1 | 8/2017 | Wang et al. | |
| 2018/0054821 A1 | 2/2018 | Sun | |
| 2018/0091196 A1 | 3/2018 | Frenne et al. | |
| 2018/0180703 A1 | 6/2018 | Kim et al. | |
| 2018/0213599 A1 | 7/2018 | Kazmi et al. | |
| 2018/0220392 A1 | 8/2018 | Ly | |
| 2019/0007923 A1* | 1/2019 | Blankenship | ......... H04L 5/0073 |

FOREIGN PATENT DOCUMENTS

| | | |
|---|---|---|
| CN | 105706385 A | 6/2016 |
| KR | 10-20160057336 | 5/2016 |
| WO | 2015199392 | 12/2015 |
| WO | 2016122761 | 8/2016 |

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 13)," 3GPP TS 36.355 V13.1.0, Mar. 2016, pp. 1-141, 3GPP.
International Search Report (PCT/KR2017/008764).
Written Opinion of the International Searching Authority (PCT/KR2017/008764).
Notification of Transmittal of the International Search Report and the Written Opinion of the International Searching Authority, or the Declaration (PCT/KR2017/008764).
3GPP TSG WG1 Meeting #85 R1-164661 Nanjing, China, May 23-27, 2016 "Adaptive RSTD reporting for indoor positioning". Ericsson.
3GPP TSG WG1 Meeting #85 R1-164449 Nanjing, China, May 23-27, 2016 "Introduction of UE inter-frequency RSTD calibration accuracy reporting". Qualcomm Incorporated.
"Text Proposal and Discussion on Further enhancements for OTDOA", R1-153744, Ericsson, 3GPP TSG RAN WG1 Meeting #82, Beijing, China, Aug. 24-28, 2015.

* cited by examiner

Standalone Mode

Guard-band Mode

In-band Mode

Standalone/Guard-band operation mode

OFDM symbol index

Standalone/Guard-band operation mode

OFDM symbol index

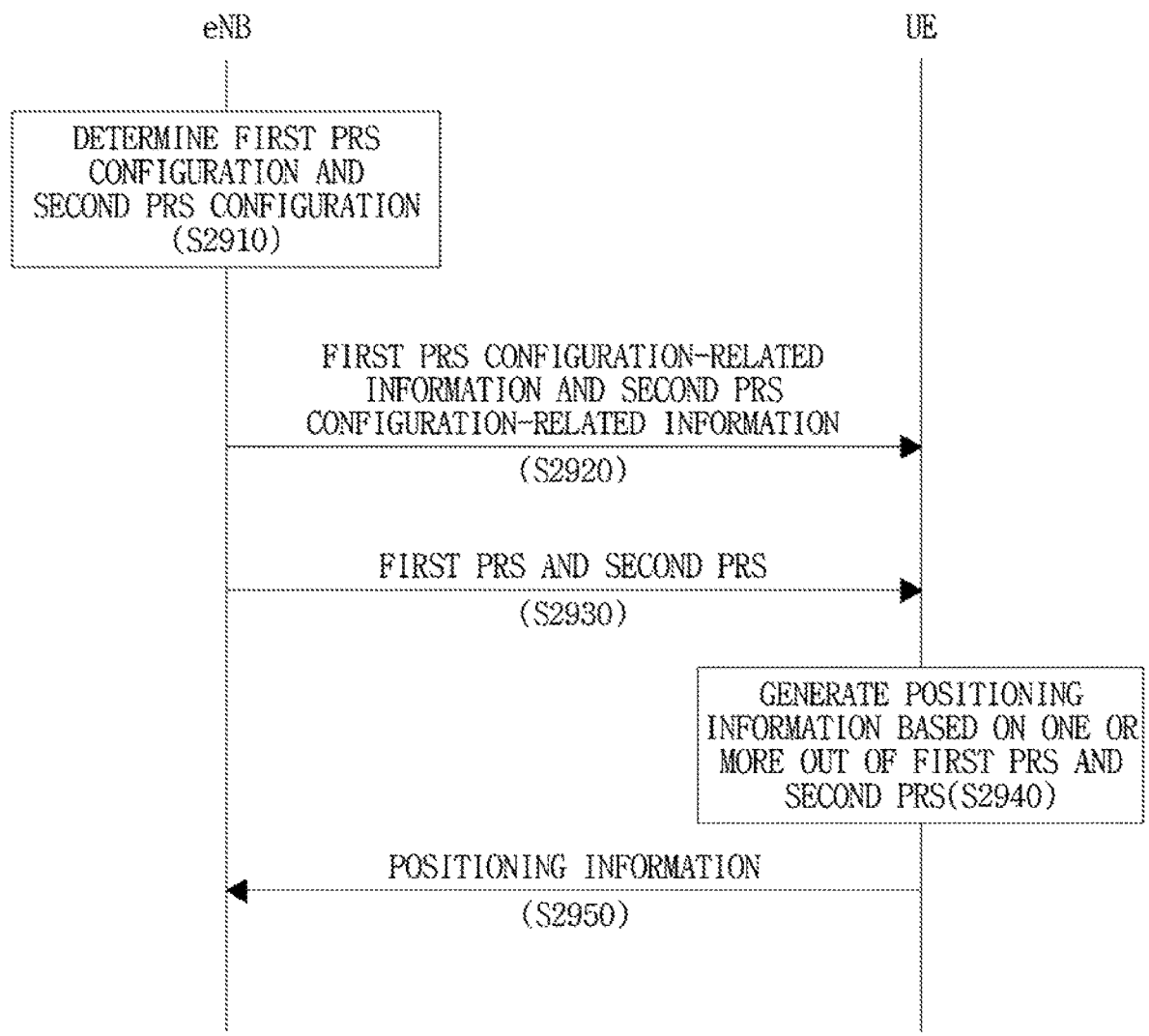

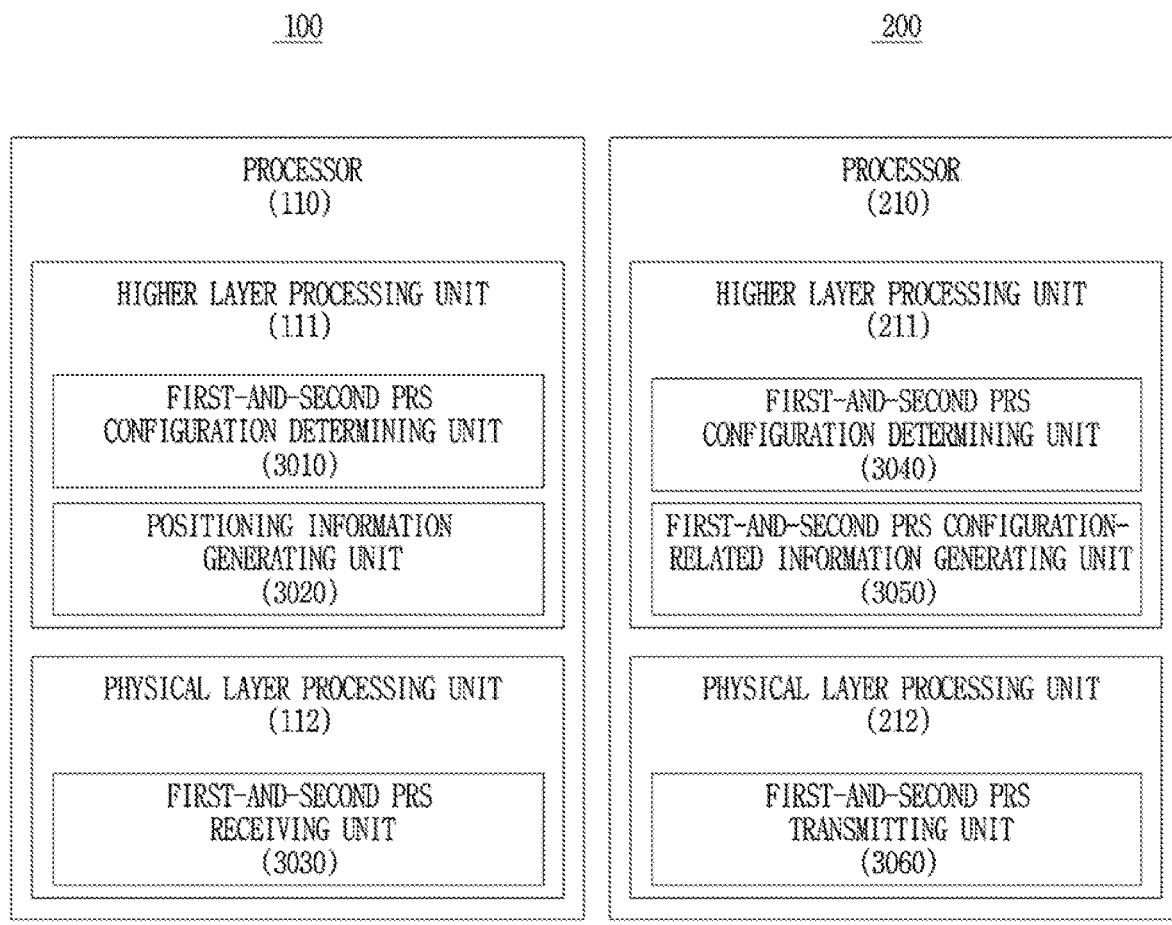

METHOD AND APPARATUS FOR TRANSMITTING/RECEIVING POSITIONING REFERENCE SIGNAL

CROSS-REFERENCE TO RELATED APPLICATIONS

This application is a continuation of U.S. patent application Ser. No. 16/901,131, filed on Jun. 15, 2020, which is a continuation of U.S. patent application Ser. No. 16/664,170, filed on Oct. 25, 2019, now issued as U.S. Pat. No. 10,700,835 on Jun. 30, 2020, which is a continuation of U.S. patent application Ser. No. 16/277,983, filed on Feb. 15, 2019, now issued as U.S. Pat. No. 10,511,426 on Dec. 17, 2019, which is a continuation of U.S. patent application Ser. No. 15/673,840, filed on Aug. 10, 2017, now issued as U.S. Pat. No. 10,256,957 on Apr. 9, 2019, which claims priority from and the benefit of Korean Patent Application Nos. 10-2016-0103209, filed on Aug. 12, 2016, and 10-2016-0126856, filed on Sep. 30, 2016, which are hereby incorporated by reference in their entirety.

BACKGROUND

1. Field

The present disclosure relates to a wireless communication system, and more particularly, to a method and apparatus for transmitting or receiving a positioning reference signal for a Narrowband Internet of Things device.

2. Discussion of the Background

The Narrowband Internet of Things (NB-IoT) concept has been proposed for the purpose of radio access to the cellular IoT based on a non-backward-compatible variant of Evolved-Universal Terrestrial Radio Access (E-UTRA).

The NB-IoT may improve indoor coverage, and may support a large number of low throughput devices, low delay sensitivity, a significantly low device cost than that of smartphones, low device power consumption, and an optimized network architecture.

The NB-IoT uses a narrow band (e.g. a bandwidth corresponding to a single Resource Block (RB) or the like), and thus physical channels, signals, and the like which have been utilized in E-UTRA, such as legacy Long-Term Evolution (LTE), may need to be newly designed. There is a need for a method of configuring a resource for a Positioning Reference Signal (PRS) to be appropriate for a narrow bandwidth, and mapping the sequence of such a PRS to the allocated resource.

However, a detailed method for configuring a PRS for NB-IoT has not yet been determined.

SUMMARY

A method and apparatus for supporting positioning in an NB-IoT system will be described.

One or more examples describe an operation method and apparatus for performing positioning for NB-IoT based on both a PRS for LTE and a PRS for NB-IoT.

One or more examples describe a method and apparatus for transmitting a PRS for NB-IoT for securing extreme coverage.

One or more examples describe a user equipment (UE) operation method and apparatus in a configuration in which an NB channel, signal, or configuration overlaps a transmission subframe of a PRS for NB-IoT.

BRIEF DESCRIPTION OF THE DRAWINGS

FIG. 29 is a flowchart illustrating NB-PRS transmission and reception operations.

FIG. 30 is a diagram illustrating the configuration of a process of a wireless device.

DETAILED DESCRIPTION

Figure 1:
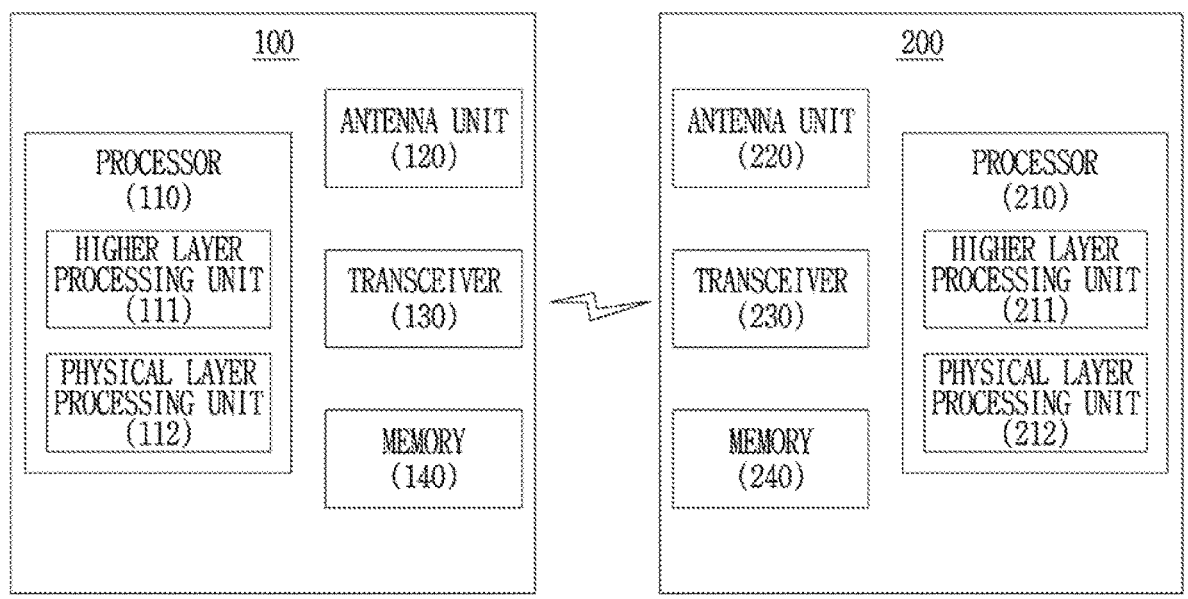
FIG. 1 is a diagram illustrating the configuration of a wireless device.

Various examples will be described more fully hereinafter with reference to the accompanying drawings. Throughout the drawings and the detailed description, unless otherwise described, the same drawing reference numerals are understood to refer to the same elements, features, and structures. In the present disclosure, detailed descriptions of known configurations or functions may be omitted for clarity and conciseness.

Further, the description herein is related to a wireless communication network, and an operation performed in a wireless communication network may be performed in a process of controlling a network and transmitting data by a system that controls a wireless network (e.g., a base station), or may be performed in a user equipment connected to the wireless communication network.

That is, it is apparent that various operations, which are performed for communicating with a terminal in a network of a plurality of nodes including a base station (BS), are executable by the BS or by other network nodes excluding the BS. The 'BS' may be replaced with terms such as a fixed station, a Node B, an evolved Node B (eNB), an access point (AP), and the like. Also, 'terminal' may be replaced with terms such as a User Equipment (UE), a Mobile Station (MS), a Mobile Subscriber Station (MSS), a Subscriber Station (SS), a non-AP station (non-AP STA), and the like.

Various examples have been described with respect to 3GPP LTE or LTE-A systems; however, aspects of the present disclosure may be applied to other mobile communication systems.

FIG. 1 is a diagram illustrating the configuration of a wireless device.

FIG. 1 illustrates a UE 100 that corresponds to an example of a downlink receiving device or an uplink transmitting device, and an eNB 200 that corresponds to an example of a downlink transmitting device or an uplink receiving device. Although not illustrated in FIG. 1, another UE that performs V2X communication with the UE 100 may exist. The configuration of the other UE is similar to that of the UE 100, and thus detailed descriptions thereof will be omitted.

The UE 100 may include a processor 110, an antenna unit 120, a transceiver 130, and a memory 140.

The processor 110 may process signals related to a baseband, and may include a higher layer processing unit 111 and a physical layer processing unit 112. The higher layer processing unit 111 may process the operations of a Medium Access Control (MAC) layer, a Radio Resource Control (RRC) layer, or a higher layer. The physical layer processing unit 112 may process the operations of a PHY layer (e.g., processing an uplink transmission signal or processing a downlink reception signal). The processor 110 may control the general operations of the UE 100, in addition to processing signals related to a baseband.

The antenna unit 120 may include one or more physical antennas, and may support MIMO transmission/reception when a plurality of antennas are included. The transceiver 130 may include a Radio Frequency (RF) transmitter and an RF receiver. The memory 140 may store information processed by the processor 110, software, an operating system, applications, or the like associated with the operations of the UE 100, and may include elements such as a buffer or the like.

The eNB 200 may include a processor 210, an antenna unit 220, a transceiver 230, and a memory 240.

The processor 210 processes signals related to a baseband, and may include a higher layer processing unit 211 and a physical layer processing unit 212. The higher layer processing unit 211 may process the operations of an MAC layer, an RRC layer, or a higher layer. The physical layer processing unit 212 may process the operations of a PHY layer (e.g., processing a downlink transmission signal or an uplink reception signal). The processor 210 may control the general operations of the eNB 200, in addition to processing signals related to a baseband.

The antenna unit 220 may include one or more physical antennas, and may support MIMO transmission/reception when a plurality of antennas are included. The transceiver 230 may include an RF transmitter and an RF receiver. The memory 240 may store information processed by the processor 210, software, an operating system, applications, or the like associated with the operations of the eNB 200, and may include elements such as a buffer or the like.

The processor 110 of the UE 100 may be configured to implement the operations of the UE, which are described herein.

An example of a radio frame structure will be described below.

Figure 2:
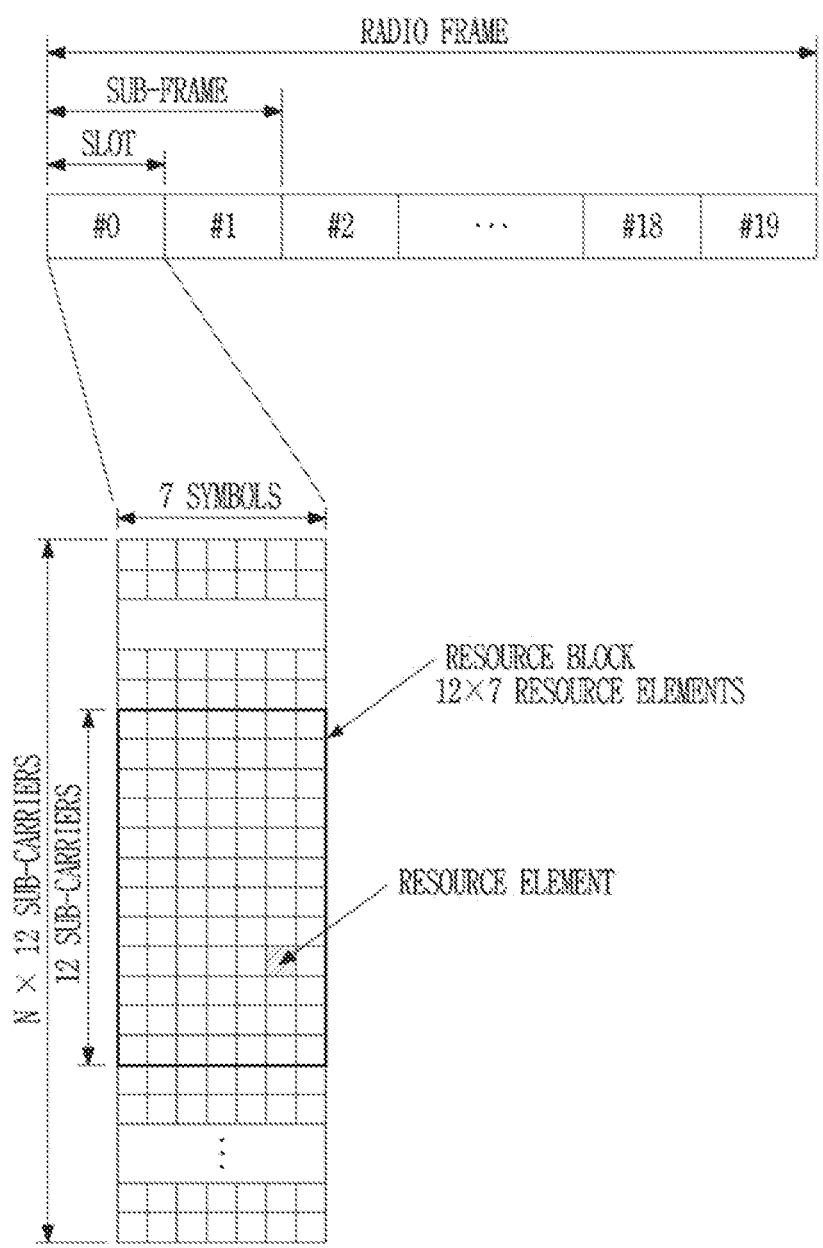
FIGS. 2 and 3 are diagrams illustrating the structure of a radio frame of a 3GPP LTE system.
Figure 3:
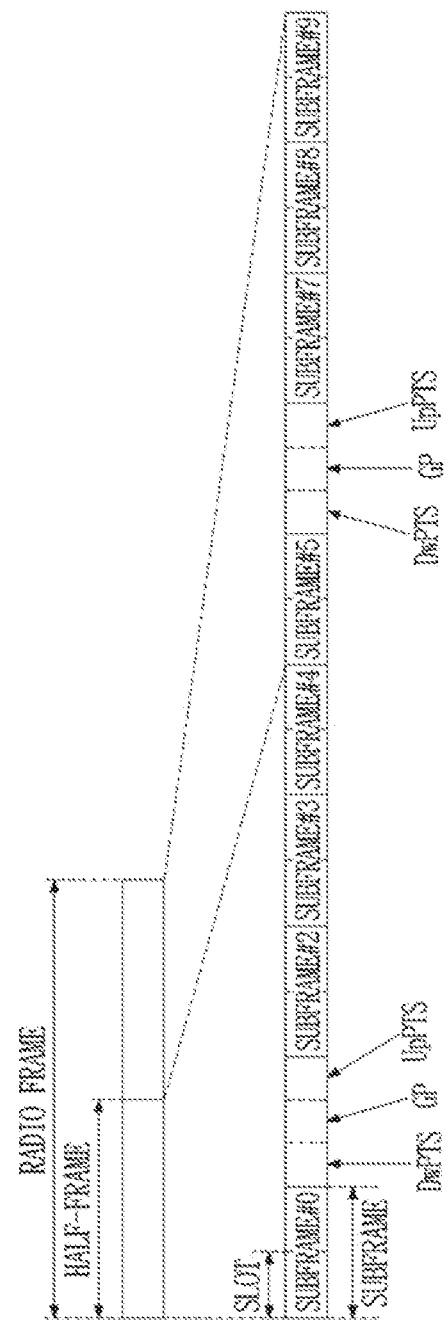

FIGS. 2 and 3 are diagrams illustrating the structure of a radio frame of a 3GPP LTE system.

In a cellular wireless packet communication system, uplink transmission or downlink transmission is executed in units of subframes. A single subframe is defined as a predetermined period of time including a plurality of symbols. The 3GPP LTE standard supports the radio frame structure type 1 that is applied to Frequency Division Duplex (FDD) and the radio frame structure type 2 that is applied to Time Division Duplex (TDD).

FIG. 2 illustrates the radio frame structure type 1. A single radio frame is formed of 10 subframes, and a single subframe is formed of 2 slots in the time domain. A time expended for transmitting a single subframe is a Transmission Time Interval (TTI). For example, the length of a single subframe is 1 ms, and the length of a single slot is 0.5 ms. A single slot may include a plurality of symbols in the time domain. The symbol may be an Orthogonal Frequency Division Multiplexing (OFDM) symbol in the downlink, or may be a Single Carrier-Frequency Division Multiple Access (SC-FDMA) in the uplink, but the symbol may not be limited thereto. The number of symbols included in a single slot may be different based on the Cyclic Prefix (CP) configuration. The CP may include an extended CP and a normal CP. In the case of the normal CP, for example, the number of symbols included in a single slot may be 7. In the case of the extended CP, the length of a symbol is extended and thus, the number of symbols included in a single slot may be 6, which is smaller than the normal CP. When the size of a cell is large or when a channel state is unstable, such as when a User Equipment (UE) moves quickly or the like, an extended CP may be used to reduce inter-symbol interference.

In FIG. 2, by assuming the case of the normal CP in a resource grid, a single slot corresponds to 7 symbols in the time domain. In the frequency domain, a system bandwidth is defined to be an integer (N) multiplied by a Resource Block (RB), a downlink system bandwidth may be indicated by a parameter $N^{DL}$, and an uplink system bandwidth may be indicated by a parameter $N_{UL}$. A resource block is a resource allocation unit, and may correspond to a plurality of symbols (e.g., 7 symbols) occupying a single slot in the time domain and a plurality of consecutive subcarriers (e.g., 12 subcarriers) in the frequency domain. Each element in a resource grid is referred to as a Resource Element (RE). A single resource block includes 12×7 REs. The resource grid in FIG. 2 may be applied equally to an uplink slot and a downlink slot. Also, the resource grid in FIG. 2 may be equally applied to a slot of the radio frame structure type 1 and a slot of the radio frame structure type 2, the latter of which will be described as follows.

FIG. 3 illustrates the radio frame structure type 2. The radio frame structure type 2 is formed of 2 half frames, and each half frame may be formed of 5 subframes, a Downlink Pilot Time Slot (DwPTS), a Guard Period (GP), and an Uplink Pilot Time Slot (UpPTS). Like the radio frame structure type 1, a single subframe is formed of 2 slots. The DwPTS is used in a UE for initial cell search, synchronization, or channel estimation, in addition to transmission/reception of data. The UpPTS is used in an eNB for channel estimation and the UE's uplink transmission synchronization. The GP is the period between an uplink and a downlink for removing interference generated in the uplink due to a multi-path delay of a downlink signal. The DwPTS, GP, and UpPTS may be also referred to as special subframes.

Figure 4:
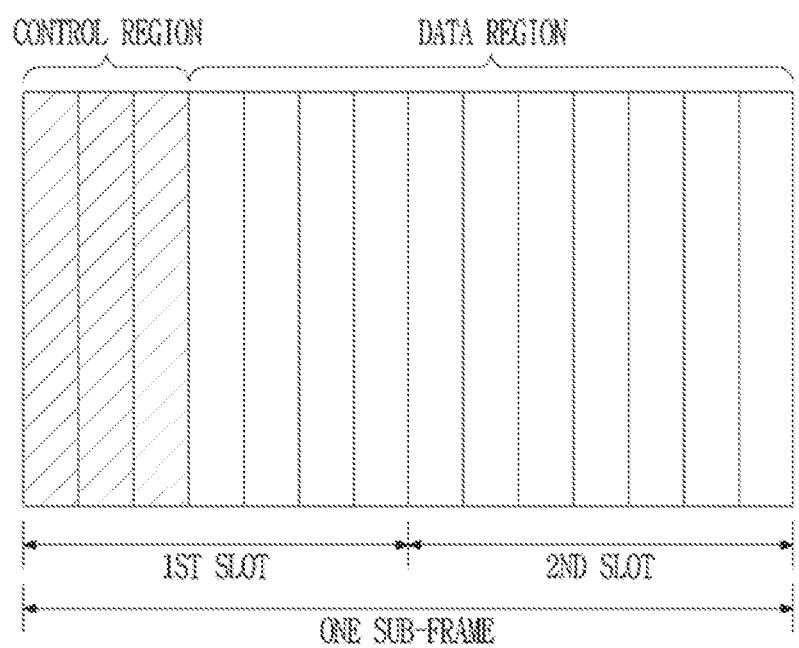
FIG. 4 is a diagram illustrating the structure of a downlink subframe.

FIG. 4 is a diagram illustrating the structure of a downlink subframe. A plurality of OFDM symbols (e.g., 3 OFDM symbols) in the front part of a first slot in a single subframe may correspond to a control region to which a control channel is allocated. The remaining OFDM symbols correspond to a data region to which a Physical Downlink Shared Channel (PDSCH) is allocated. Downlink control channels used in the 3GPP LTE system may include a Physical Control Format Indicator Channel (PCFICH), a Physical Downlink Control Channel (PDCCH), a Physical Hybrid automatic repeat request Indicator Channel (PHICH), and the like. In addition, an Enhanced Physical Downlink Control Channel (EPDCCH) may be transmitted to UEs set by an eNB in the data region.

The PCFICH is transmitted in the first OFDM symbol of a subframe, and may include information associated with the number of OFDM symbols used for a control channel transmission in the subframe.

The PHICH is a response to an uplink transmission, and includes HARQ-ACK information.

Control information transmitted through the (E)PDCCH is referred to as downlink control information (DCI). The DCI includes uplink or downlink scheduling information, or may include other control information based on various purposes, such as a command for controlling uplink transmission power with respect to a UE group or the like. An eNB determines an (E)PDCCH format based on DCI transmitted to a UE, and assigns a Cyclic Redundancy Check (CRC) to control information. The CRC is masked with a Radio Network Temporary Identifier (RNTI) selected based on a use type or a transmitting entity of the (E)PDCCH. When the (E)PDCCH is used for a predetermined UE, the CRC may be masked with a cell-RNTI (C-RNTI) of the UE. Alternatively, when the (E)PDCCH is used for a paging message, the CRC may be masked with a paging indicator identifier (P-RNTI). When the (E)PDCCH is used for a system information block (SIB), the CRC may be masked with a system information identifier and a system information RNTI (SI-RNTI). To indicate a random access response with respect to a random access preamble transmission of a UE, the CRC may be masked with a random access-RNTI (RA-RNTI).

Figure 5:
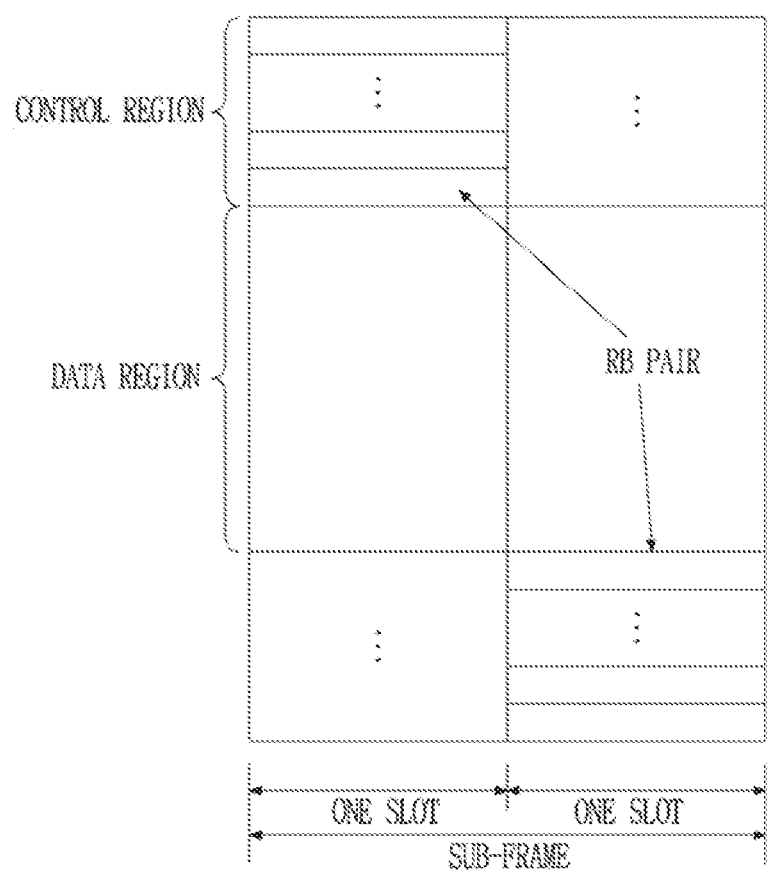
FIG. 5 is a diagram illustrating the structure of an uplink subframe.

FIG. 5 is a diagram illustrating the structure of an uplink subframe. An uplink subframe may be divided into a control region and a data region in the frequency domain. A physical uplink control channel (PUCCH) including uplink control information may be allocated to the control region. A physical uplink shared channel (PUSCH) including user data may be allocated to the data region. A PUCCH for a single terminal may be allocated to a resource block pair (RB pair) in a subframe. The resource blocks included in the RB pair may occupy different sub-carriers with respect to two slots, which indicates that the RB pair allocated to a PUCCH is frequency-hopped at a slot boundary.

Figure 6:
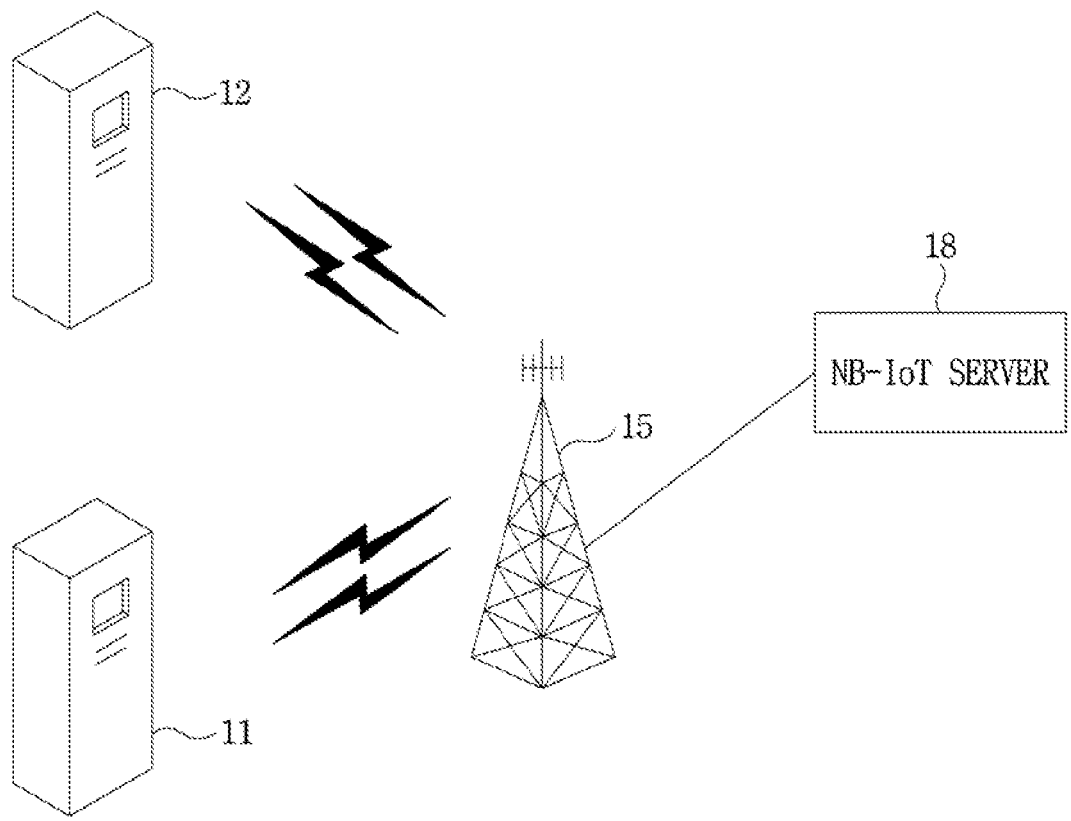
FIG. 6 is a diagram illustrating an example of NB-IoT.

FIG. 6 is a diagram illustrating an example of NB-IoT. From the perspective of Internet of Things (IoT) technology, NB-IoT may be connected to the basic concept of Machine-Type Communication (MTC) or Machine to Machine (M2M) communication, except for the fact that NB-IoT uses a narrow band. NB-IoT may include the exchange of information between NB-IoT UEs 11 and 12 through an eNB 15, excluding human interaction, or alternatively may include the exchange of information between the NB-IoT UE 11 and 12 and an NB-IoT server 18 through an eNB.

The NB-IoT server 18 may be an entity that communicates with the NB-IoT UEs 11 and 12. The NB-IoT server may execute an NB-IoT-related application, and may provide an NB-IoT-specific service to the NB-IoT UEs 11 and 12.

The NB-IoT UEs 11 and 12 may be stationary or mobile wireless devices that provide NB-IoT.

Figure 7A:
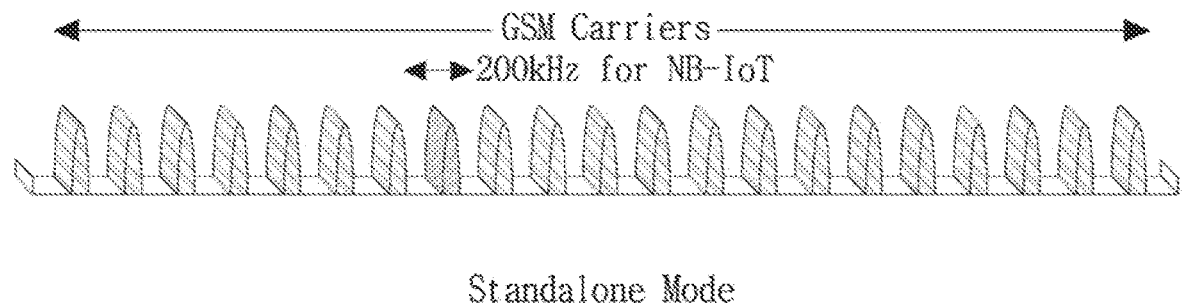
FIGS. 7A-7C are diagrams illustrating an NB-IoT operation mode.
Figure 7B:
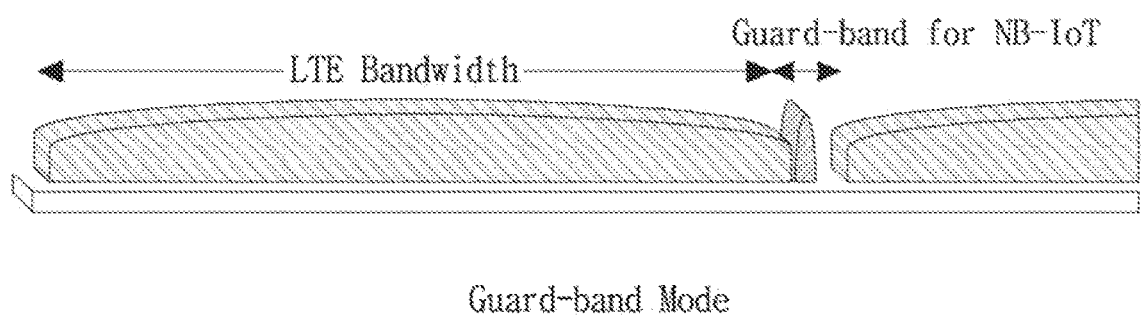
Figure 7C:
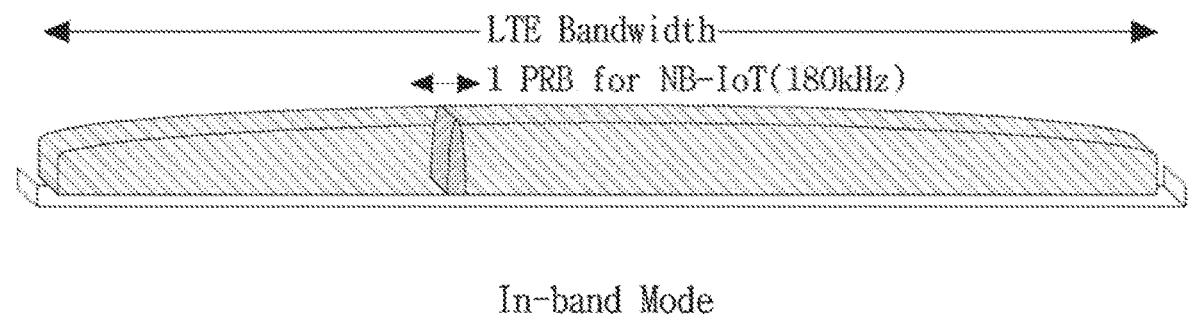

FIGS. 7A-7C are diagrams illustrating an NB-IoT operation mode.

NB-IoTs may operate in one of three operation modes as shown in FIG. 7. The three operation modes are a standalone operation mode, a guard-band operation mode, and an in-band operation mode.

FIG. 7A illustrates a standalone operation mode. A spectrum currently used in an Enhanced Data Rates for GSM Evolution (GSM/EDGE) Radio Access Network (GERAN) system, which corresponds to one or more Global System for Mobile Communications (GSM) carriers, may be used. For example, one of the GSM carriers (e.g., a frequency region of a 200 kHz-bandwidth) may be used for NB-IoT technology.

FIG. 7B illustrates a guard-band operation mode. Resource blocks, which are not used in a guard-band existing outside the bandwidth of an LTE carrier, may be used.

FIG. 7C illustrates an in-band operation mode. Resource blocks in the bandwidth of an LTE carrier may be used. For example, one PRB in the LTE bandwidth (e.g., a frequency region of a 180 kHz-bandwidth) may be used for NB-IoT.

NB-IoT devices aim to mainly support scenarios in which NB-IoT devices are operated in buildings or basements of buildings in order to provide a smart metering service, a smart home service, an alarm service, or the like. This may mean that reliable data transmission/reception needs to be supported in rooms or basements that are generally known to be low performance areas, irrespective of the deployment of NB-IoT devices. Further, lower power consumption and less complexity need to be maintained, and at the same time, connections to multiple NB-IoT devices (50,000 NB-IoT devices from the perspective of a single cell) need to be maintained. The requirements of an NB-IoT system, considered here on the basis of the technologies associated with the GERAN system, are as shown in Table 1.

TABLE 1

| Performance | Objectives |
|---|---|
| Improved indoor coverage | MCL (Maximum Coupling Loss) 164 dB |
| Cell Capacity | 52574 devices per cell |
| Reduced complexity | Very cheap based on mass scale deployment or in a disposable manner |
| Improved power efficiency | About 10-year battery life |
| Latency | 10 seconds for Mobile Autonomous Reporting (MAR) exception reports (in general support relaxed delay characteristics |
| Coexistence | GSM/WCDMA/LTE |

The characteristics of a downlink defined in the NB-IoT will be described here. An NB-IoT downlink has a subcarrier spacing of 15 kHz, as in conventional LTE, and has a resource structure defined by a 180 kHz band corresponding to a single Physical Resource Block (PRB) in the frequency axis and by a Transmission Time Interval (TTI) of 1 ms corresponding to a single subframe and a radio frame of 10 ms in the time axis. As described above, because NB-IoT operates a service in an in-band operation mode or a guard-band operation mode on a carrier where LTE operates, NB-IoT is designed to adopt LTE numerology that defines a physical layer structure, as those of LTE, in order to avoid interference with LTE.

A Narrowband Primary Synchronization Signal (NPSS) and a Narrowband Secondary Synchronization Signal (NSSS), which are synchronization signals in the NB-IoT, may have different characteristics from a synchronization signal in conventional LTE. The NPSS includes a Zadoff-Chu (ZC) sequence having a sequence length of 11 and a root index value of 5. The NSSS includes a combination of a ZC sequence having a sequence length of 131 and a binary scrambling sequence, such as a Hadamard sequence. In particular, the NSSS indicates a Physical Cell Identity (PCID) to NB-IoT UEs in a cell through a combination of the sequences. Also, in order to reduce the number of times that blind decoding is performed during the reception of a Narrowband Physical Broadcasting Channel (NPBCH) that transfers Master Information Block (MIB) information in a NB-IoT system, four NSSS transmission frames are indicated to correspond to four cyclic shift values forming an NSSS sequence within a 80 ms-frame.

Figure 8:
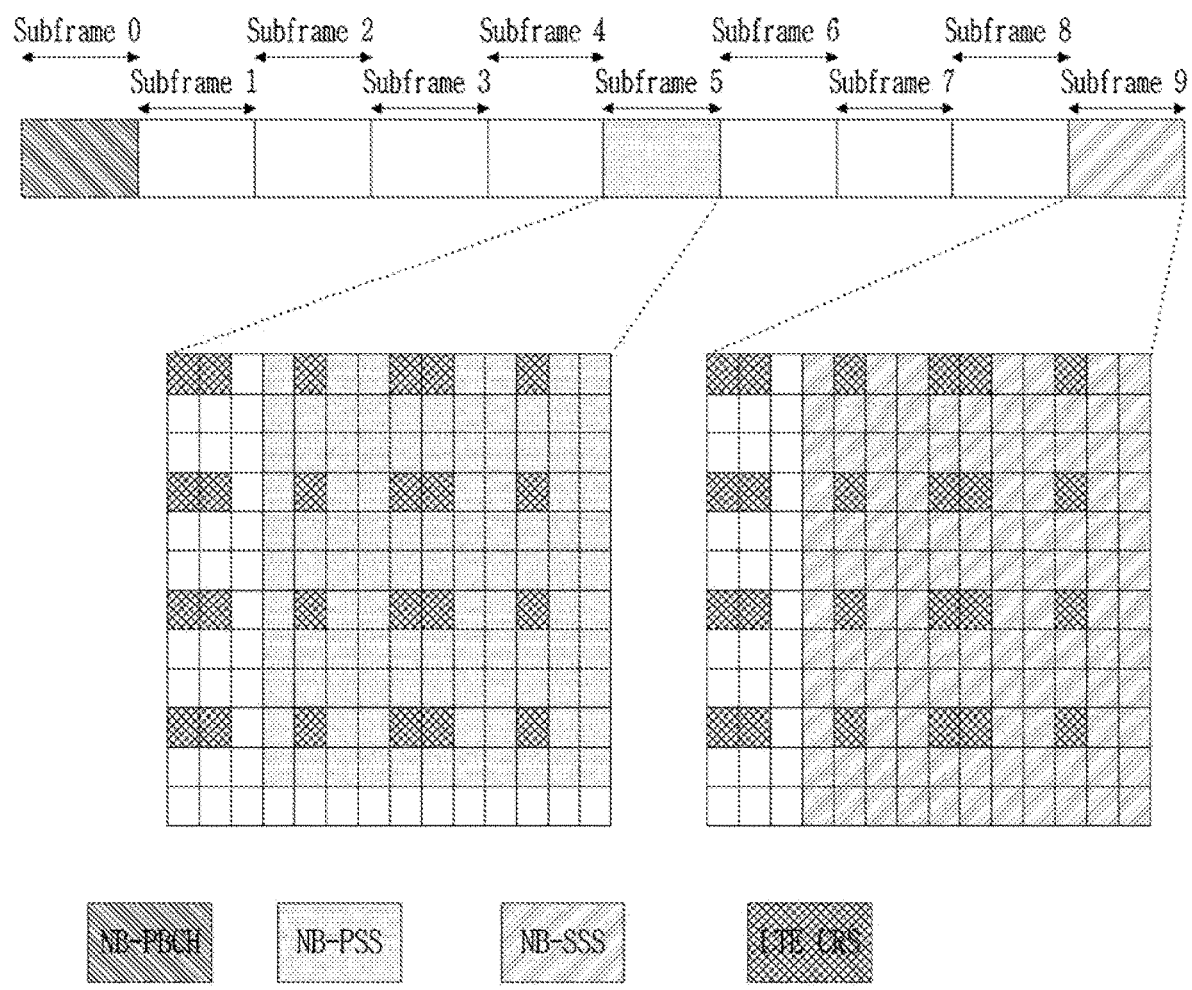
FIG. 8 is a diagram illustrating a resource allocation scheme for an NB-IoT signal and a legacy LTE signal in an in-band operation mode.

FIG. 8 is a diagram illustrating a resource allocation scheme for an NB-IoT signal and a legacy LTE signal in an in-band operation mode. For ease of implementation, an NPSS and an NSSS are not transmitted in first three OFDM symbols of a subframe corresponding to a transmission resource region for a control channel in conventional LTE, irrespective of operation mode. Resource Elements (REs) for an NPSS/NSSS that collides with a Common Reference Signal (CRS) of conventional LTE on a physical resource are punctured, thereby not affecting a legacy LTE system.

Figure 9:
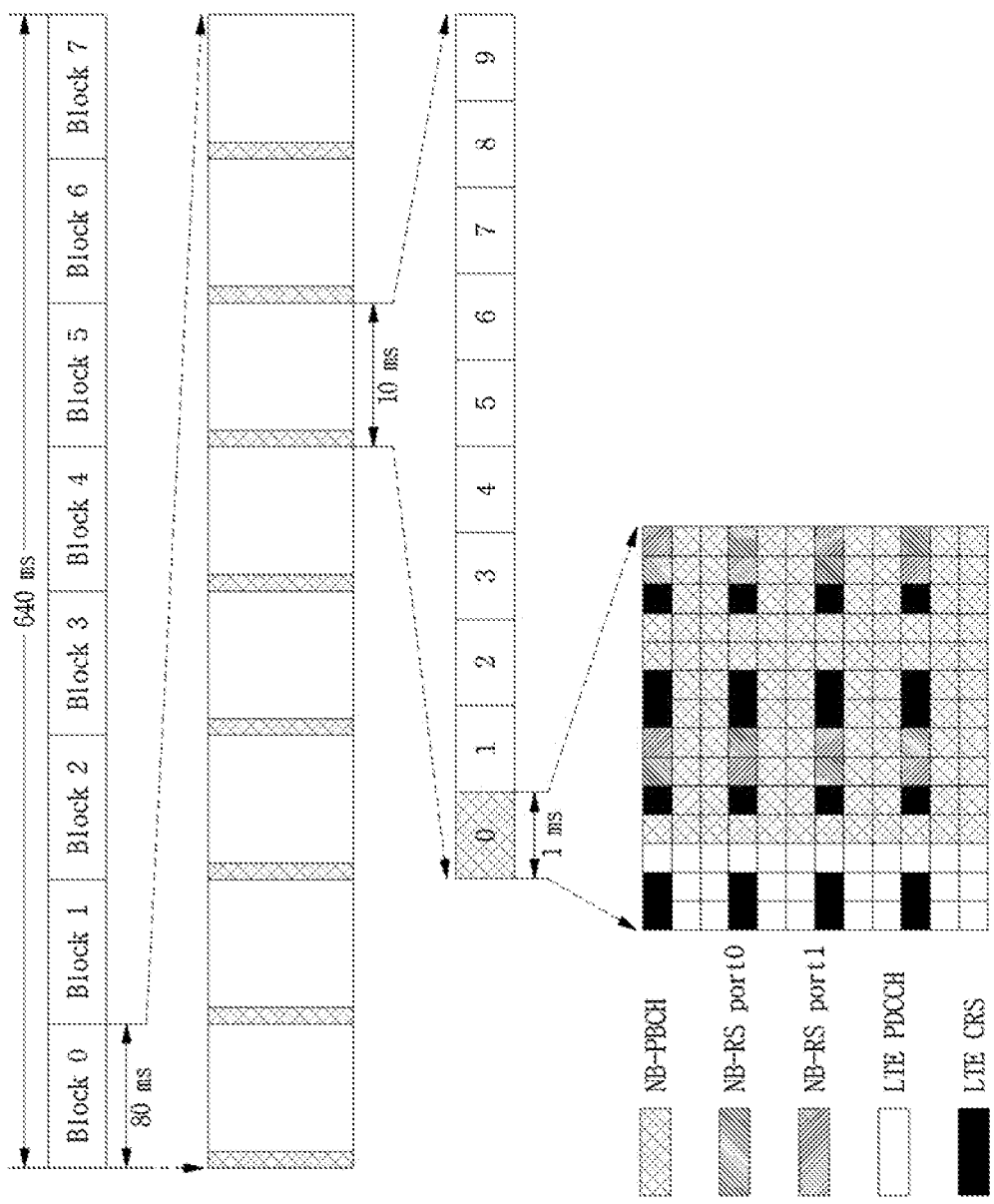
FIG. 9 is a diagram illustrating an NPBCH transmission scheme in an in-band operation mode.

FIG. 9 is a diagram illustrating an NPBCH transmission scheme in an in-band operation mode.

An NPBCH (or NB-PBCH) is transmitted in a subframe having a subframe index value of 0 in each radio frame. In the subframe in which an NPBCH is transmitted, the first three OFDM symbols are not used for transmitting an NPBCH, irrespective of NB-IoT operation mode. An NPBCH recognizes resource allocation information associated with an RE used for a CRS in LTE based on a Physical Cell Identity (PCID) obtained from an NSSS, and performs rate matching accordingly. The same MIB information transmitted through an NPBCH is maintained during 640 ms, and is configured as an information block that may be independently decoded during 80 ms, as shown in FIG. 9. Through the above described transmission scheme, an NB-IoT UE may more reliably decode an NPBCH and may provide a lower access delay speed. Also, MIB information may include a system frame number, HyperSFN (i.e., index information that increases for each SFN wrap-around), a system information value tag, the number of LTE CRS antenna ports, the operation mode, a channel raster offset, SIB1 scheduling information, and the like, which are important information that a UE needs in order to access an NB-IoT system. The MIB information may be provided to NB-IoT UEs in a cell.

Figure 10:
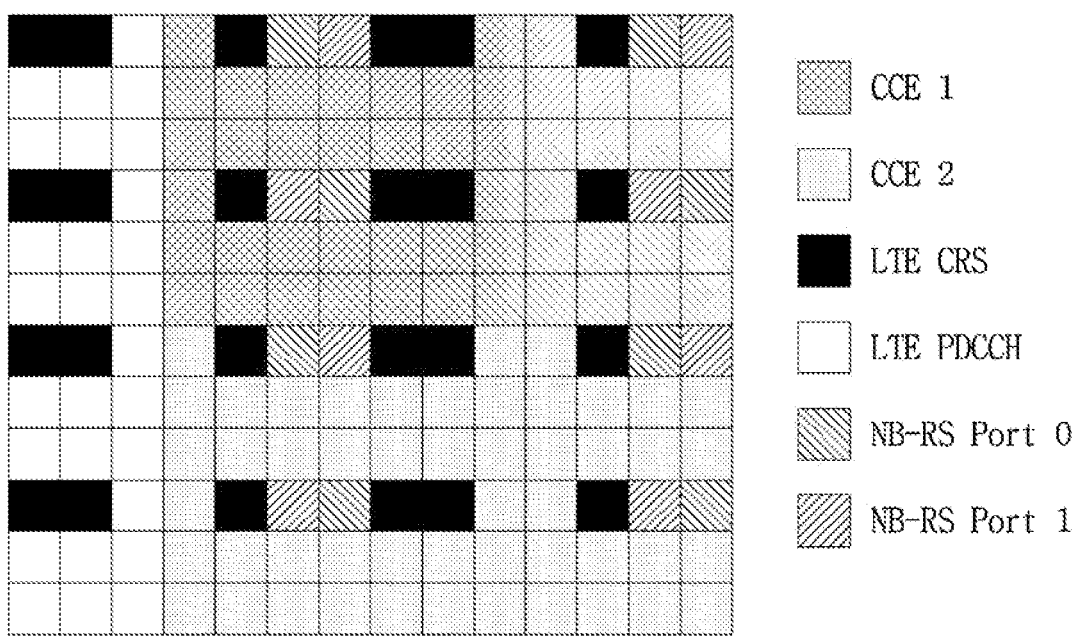
FIG. 10 is a diagram illustrating a Narrowband Control Channel Element (NCCE) resource allocation scheme in an in-band operation mode.

FIG. 10 is a diagram illustrating a Narrowband Control Channel Element (NCCE) resource allocation scheme in an in-band operation mode.

The characteristics of a physical layer associated with a Narrowband Physical Downlink Shared Channel (NPDSCH) for transmitting data and with a Narrowband Physical Downlink Control Channel (NPDCCH) for transmitting control information and scheduling information for data in an NB-IoT system will be described as follows. In the case of an NPDCCH, a Narrowband Control Channel Element (NCCE) is configured without defining a Resource Element Group (REG), unlike a Physical Downlink Control Channel and an Enhanced PDCCH (EPDCCH), which comprise a plurality of REGs. Further, two NCCEs are allocated to a single PRB pair, as shown in FIG. 10. Therefore, a minimum resource unit forming an NPDCCH is an NCCE. NPDCCH format 1, which includes a maximum of 2 NCCEs (whereas NPDCCH format 0 includes a single NCCE), may be repeatedly transmitted in a plurality of subframes in order to provide wider-than-normal coverage.

Therefore, a UE needs to know in advance information associated with a search space for decoding an NPDCCH, which may be transmitted in a single or a plurality of subframes. The search space for an NPDCCH includes both a UE-specific search space for a UE's unicast data scheduling and a common search space for paging and random access, like a PDCCH in conventional LTE.

From the perspective of a UE-specific search space, a UE performs blind decoding of a plurality of NPDCCH candidate transmissions determined according to a repetition level (R) and a concatenation level (L'∈{1, 2}) on the basis of the maximum repetition level ($R_{max}$), in a search space start subframe indicated by higher layer signaling as shown in Table 2. The UE may obtain scheduling information for the reception of an NPDSCH by receiving an NPDCCH. NPDCCH format 1 and NPDCCH format 2, which are Downlink Control Information (DCI) formats in NB-IoT, may indicate a scheduling delay for the timing of an NPDSCH transmission subframe.

Table 2 indicates NPDCCH UE-specific search space candidates.

TABLE 2

| | | NCCE indices of monitored NPDCCH candidates | |
|---|---|---|---|
| $R_{max}$ | R | L' = 1 | L' = 2 |
| 1 | 1 | {0}, {1} | {0, 1} |
| 2 | 1 | {0}, {1} | {0, 1} |
|   | 2 | — | {0, 1} |
| 4 | 1 | — | {0, 1} |
|   | 2 | — | {0, 1} |
|   | 4 | — | {0, 1} |
| >=8 | $R_{max}/8$ | — | {0, 1} |
|   | $R_{max}/4$ | — | {0, 1} |
|   | $R_{max}/2$ | — | {0, 1} |
|   | $R_{max}$ | — | {0, 1} |

Note 1:
{x}, {y} denotes NPDCCH Format 0 candidate with NCCE index 'x', and NPDCCH Format 0 candidate with NCCE index 'y' are monitored
Note 2:
{x, y} denotes NPDCCH Format1 candidate corresponding to NCCEs 'x' and 'y' is monitored.

Figure 11:
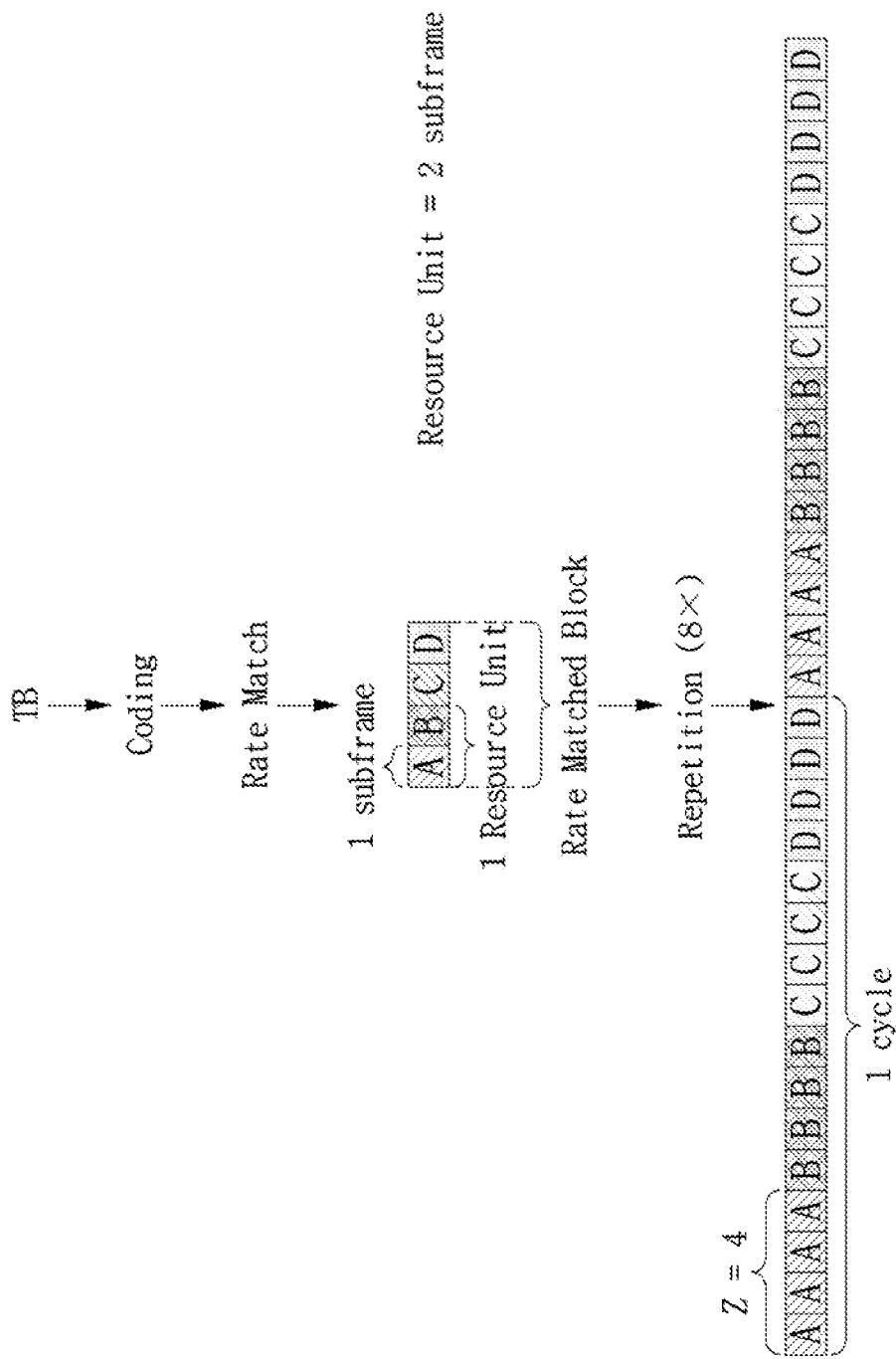
FIG. 11 is a diagram illustrating rate matching associated with a transport block and cyclic subframe level repetition.

FIG. 11 is a diagram illustrating rate matching associated with a transport block and cyclic subframe level repetition.

An NPDSCH may transmit a Transport Block (TB) having a Transport Block Size (TBS) of a maximum of 680 bits through one or more PRB pairs. The possible range of the quantity of PRB pairs may be one to a maximum of ten PRB pairs. A single TB is cyclically and repeatedly transmitted in a plurality of subframes. For example, rate matching associated with a single TB is performed, whereby the single TB is cyclically and repeatedly transmitted in a plurality of subframes through an NPDSCH, as shown in FIG. 11. The cyclic repetitive transmission may also be applied to a Narrowband Physical Uplink Shared Channel (NPUSCH), which is an uplink data channel.

In addition, a gap may be configured for uplink and/or downlink between continuous repetitive transmissions of a large number of physical channels, in order to secure the transmission of control information and data for other UEs.

Next, operations of a system in which different Positioning Reference Signals (PRS) are defined will be described. The different PRSs may be referred to as a first PRS and a second PRS. For example, the first PRS may be a PRS used in NB-IoT (hereinafter an NB-PRS), and the second PRS may be a PRS defined in an LTE system (hereinafter LTE PRS). Although the following examples are described by assuming that the first PRS is an NB-PRS and the second PRS is an LTE PRS, examples are not limited thereto, and the following examples may be applied when different PRSs are defined.

Before the description of examples associated with an NB-PRS, an LTE PRS will be described.

An LTE PRS may only be transmitted in a downlink subframe configured for PRS transmission through higher layer signaling. When both a normal subframe and a Multicast Broadcast Single Frequency Network (MBSFN) subframe are configured as positioning subframes, the OFDM symbols in the MBSFN subframe configured for positioning need to use the same Cyclic Prefix (CP) as that of subframe #0. When only an MBSFN subframe is configured as a subframe for positioning, the symbols in the corresponding MBSFN subframe configured to transmit a PRS need to use an extended CP.

The LTE PRS is transmitted through antenna port (AP) #6.

The LTE PRS may not be allocated to time/frequency resources to which a Physical Broadcast Channel (PBCH), and a Primary Synchronization Signal (PSS)/Secondary Synchronization Signal (SSS) are allocated.

The LTE PRS is defined in an environment where a subcarrier space is 15 kHz (i.e., Δf=15 kHz).

An LTE PRS sequence may be generated using a Gold-sequence-based pseudo-random sequence generator as shown in Equation 1. The pseudo-random sequence generator may be initialized to $c_{init}$ at the start of each OFDM symbol as shown in Equation 2.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max,DL} - 1$$

$$c_{init} = 2^{10} \cdot (7 \cdot (n_s + i) + l + 1) \cdot (2 \cdot N_{ID}^{cell} + 1) + 2 \cdot N_{ID}^{cell} + N_{CP}$$ [Equation 2]

$$N_{CP} = \begin{cases} 1 & \text{for normal } CP \\ 0 & \text{for extended } CP \end{cases}$$

In Equation 1, l denotes a symbol index, $n_s$ denotes a slot index, and $N_{RB}^{max,DL}$ denotes the maximum number of downlink resource blocks. In Equation 2, $N_{ID}^{cell}$ denotes a physical layer cell identity. As shown in Equation 1, the LTE PRS is always generated based on the maximum number of downlink resource blocks ($N_{RB}^{max,DL}$), although the location and the size of a resource block to which the LTE PRS is actually mapped may vary.

In a downlink subframe configured for LTE PRS transmission, the LTE PRS sequence may be mapped to an RE, wherein the location of the RE may be determined based on Equation 3 in the case of a normal CP, or may be determined based on Equation 4 in the case of an extended CP.

[Equation 3]

$$a_{k,l}^{(p)} = r_{l,n_s}(m')$$

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

[Equation 4]

$$a_{k,l}^{(p)} = r_{l,n_s}(m')$$

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 } PBCH \text{ antenna ports)} \\ 2, 4, 5 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

$$v_{shift} = N_{ID}^{cell} \bmod 6 \quad \text{[Equation 5]}$$

In Equations 3 and 4, the reference signal sequence $r_{l,n_s}(m')$ from Equation 1 may be mapped to a complex-valued modulation symbol $a_{k,l}^{(p)}$ which is used as a reference signal for an antenna port P. Here, k denotes a subcarrier index, $N_{RB}^{DL}$ denotes a downlink bandwidth configuration (e.g., the number of RBs allocated for a downlink), $N_{RB}^{PRS}$ denotes an LTE PRS bandwidth configured by a higher layer, and $v_{shift}$ denotes a cell-specific frequency deviation value as shown in Equation 5. In Equations 3 and 4, m' indicates that a PRB for an LTE PRS is located in a frequency region that corresponds to the center of a bandwidth corresponding to the maximum number of downlink resource blocks. That is, out of the sequence generated based on the maximum number of downlink resource blocks according to Equation 1, only a sequence that corresponds to the location of a PRB to which the LTE PRS is mapped is actually mapped to an RE according to Equation 3 and 4.

Figure 12:
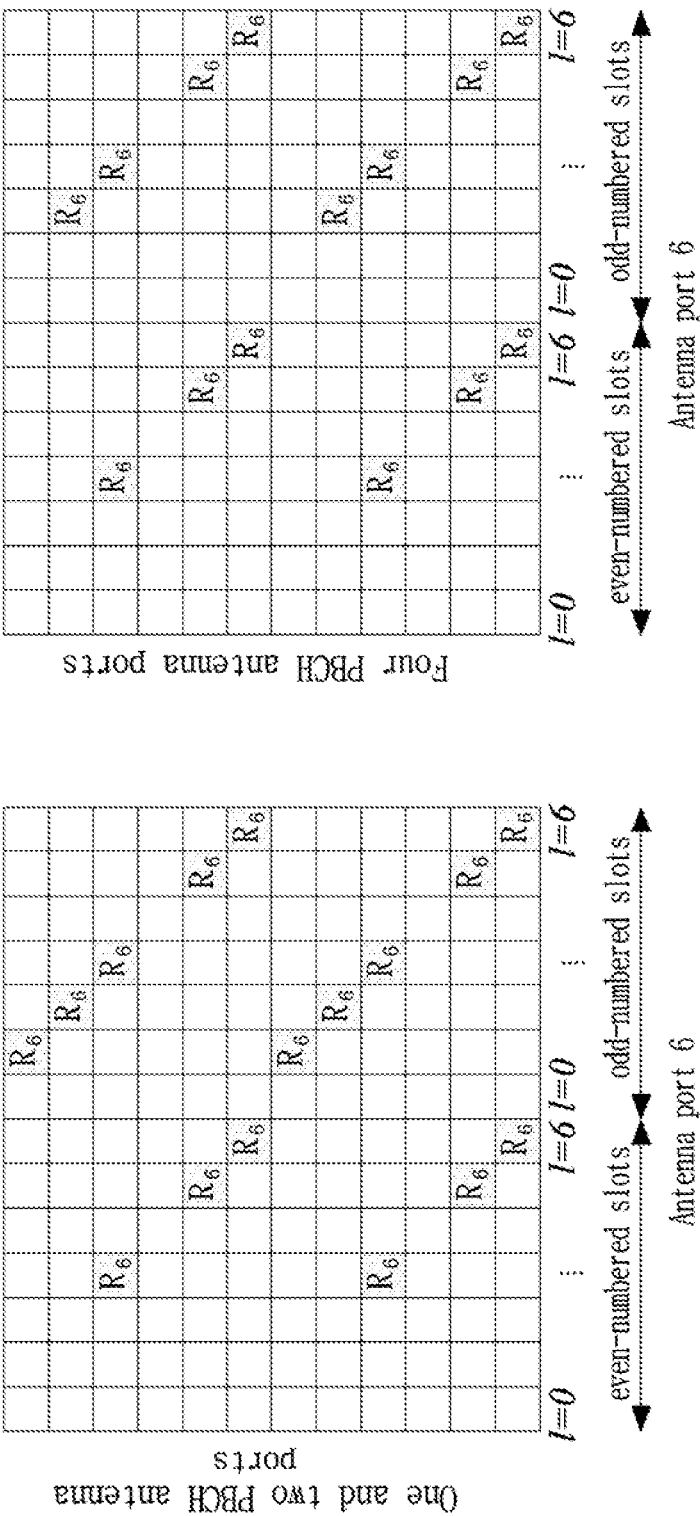
FIGS. 12 and 13 are diagrams illustrating an RE pattern in which an LTE PRS is mapped to a single resource block pair.
Figure 13:
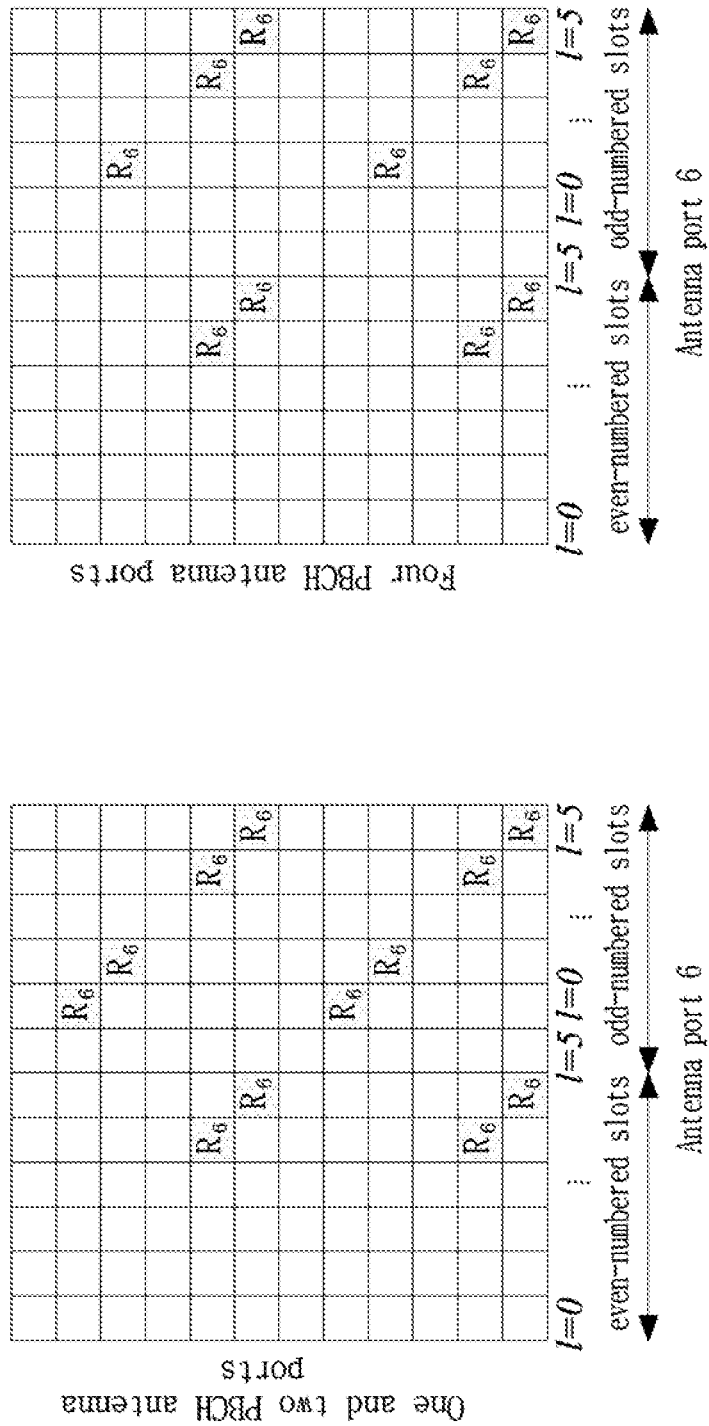

FIGS. 12 and 13 are diagrams illustrating an RE pattern in which an LTE PRS is mapped to a single resource block pair.

FIG. 12 illustrates examples of the location of an RE to which an LTE PRS is mapped when the number of PBCH antenna ports is 1 or 2 and the number of PBCH antenna ports is 4 in the case of the normal CP.

FIG. 13 illustrates examples of the location of an RE to which an LTE PRS is mapped when the number of PBCH antenna ports is 1 or 2 and the number of PBCH antenna ports is 4 in the case of the extended CP.

Next, a subframe configuration associated with an LTE PRS will be described.

A cell-specific subframe configuration period $T_{PRS}$ and an offset $\Delta_{PRS}$ for LTE PRS transmission may be set according to Table 3 provided below. A $T_{PRS}$ and the $\Delta_{PRS}$ corresponding to the value of an $I_{PRS}$ provided through higher layer signaling may be determined based on Table 3. Accordingly, an LTE PRS transmission subframe is determined by a period $T_{PRS}$ based on a subframe that is $\Delta_{PRS}$ distant from a subframe corresponding to System Frame Number (SFN) 0. Here, the LTE PRS may be transmitted on $N_{PRS}$ consecutive downlink subframes from the subframe determined by $T_{PRS}$ and $\Delta_{PRS}$, and the value of $N_{PRS}$ may be provided to a UE through higher layer signaling. That is, each LTE PRS positioning occasion may include $N_{PRS}$ consecutive downlink subframes.

TABLE 3

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

Table 4 illustrates an example of higher layer signaling associated with an LTE PRS configuration.

TABLE 4

```
-- ASN1START
PRS-Info ::= SEQUENCE {
  prs-Bandwidth          ENUMERATED { n6, n15, n25, n50, n75,
                         100, ... },
  prs-ConfigurationIndex INTEGER (0..4095),
  numDL-Frames           ENUMERATED {sf-1, sf-2, sf-4, sf-6, ...},
  ...,
  prs-MutingInfo-r9      CHOICE {
    po2-r9                 BIT STRING (SIZE(2)),
    po4-r9                 BIT STRING (SIZE(4)),
    po8-r9                 BIT STRING (SIZE(8)),
    po16-r9                BIT STRING (SIZE(16)),
    ...
  }
                         OPTIONAL       -- Need OP
}
-- ASN1STOP
```

An information element in Table 4 may be referred to as PRS-Info, and may provide information associated with an LTE PRS configuration in a cell.

LTE PRS configuration information may include configuration information of an LTE PRS (e.g., an LTE PRS for the Observed Time Difference Of Arrival (OTDOA)) for a single reference serving cell from an LTE positioning protocol (LPP) layer, that is, a location server. The LTE PRS configuration information may be provided to a UE via an eNB.

The LTE PRS configuration information may include the parameters shown in Table 4. Particularly, a PRS bandwidth (PRS-Bandwidth) is a value which corresponds to a bandwidth used for configuring an LTE PRS, and is expressed as the number of PRBs. The value of a PRS configuration index (prs-Configuration Index) may indicate the value of $I_{PRS}$ as shown in Table 3, and a PRS period ($T_{PRS}$) and an offset value ($\Delta_{PRS}$) may be set based thereon. The number of downlink subframes (numDL-Frames) may indicate the number of consecutive subframes ($N_{PRS}$) in which an LTE PRS is transmitted. PRS muting information provides information associated with the PRS muting configuration of a cell, is counted using an LTE PRS positioning occasion as a unit, and is indicated in bitmap form having a period of $T_{REP}$. When a bit is 0, LTE PRS transmission is not performed in all downlink subframes in the corresponding PRS positioning occasion (i.e., the LTE PRS transmission is muted).

Figure 14:
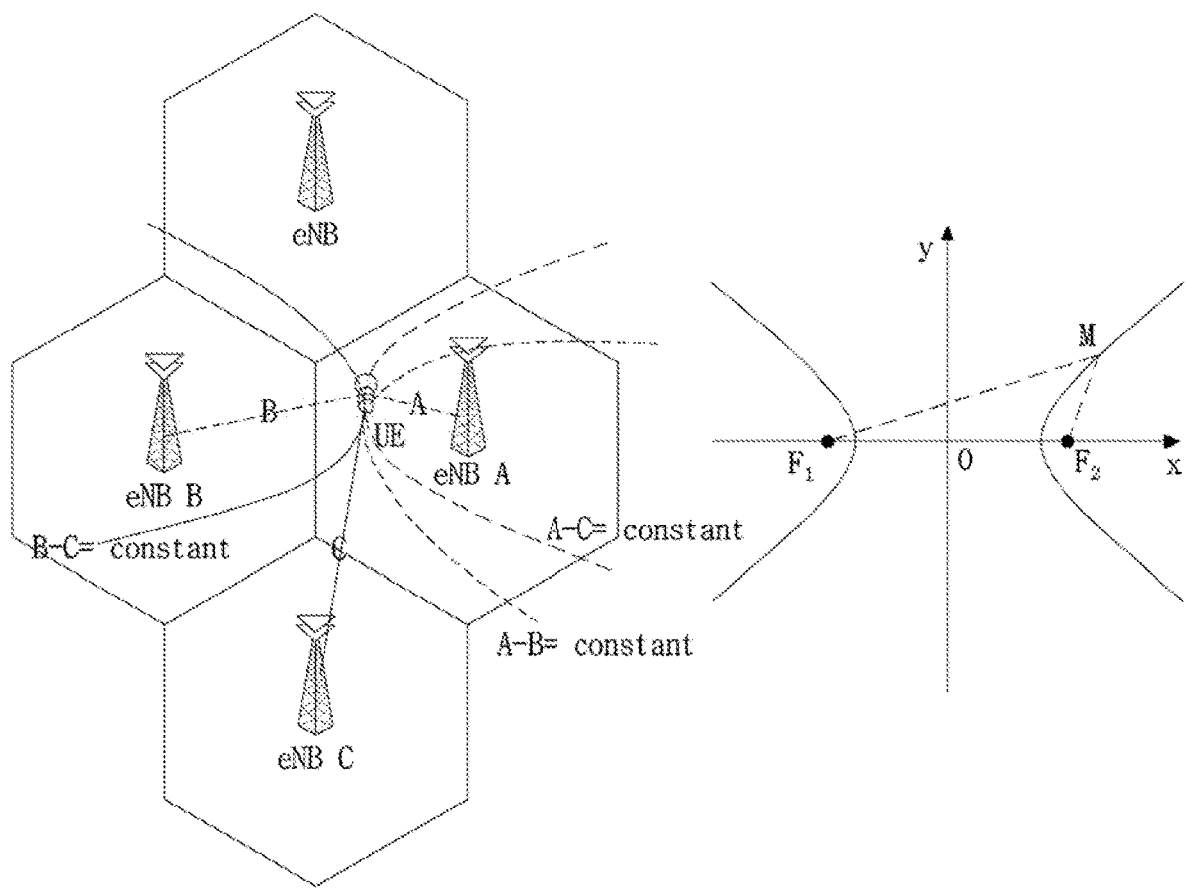
FIG. 14 is a diagram illustrating an Observed Time Difference Of Arrival (OTDOA) process.

FIG. 14 is a diagram illustrating an Observed Time Difference Of Arrival (OTDOA).

OTDOA is a positioning scheme in which a communication satellite transmits information to a terrestrial station in LTE. OTDOA is based on measuring arrival time differences of radio signals transmitted from various locations. A plurality of cells transmits reference signals, and a UE may receive the same. Because the distances between the plurality of cells and the UE are different, the arrival times when the UE receives the reference signals transmitted from the plurality of cells are different from each other. The time differences may be recorded by the UE and may be transmitted to a network. The network combines the time differences and the antenna location information of each cell to calculate the location of the UE. At least three cells may be measured by the UE, and the at least three cells may include a reference cell and a neighboring cell.

The difference in time between when the UE receives reference signals from each of a pair of eNBs is defined as a Reference Signal Time Difference (RSTD). The position measurement is based on measuring a TDOA of a predetermined reference signal, which is included in a downlink signal and is received from other eNBs.

Figure 15:
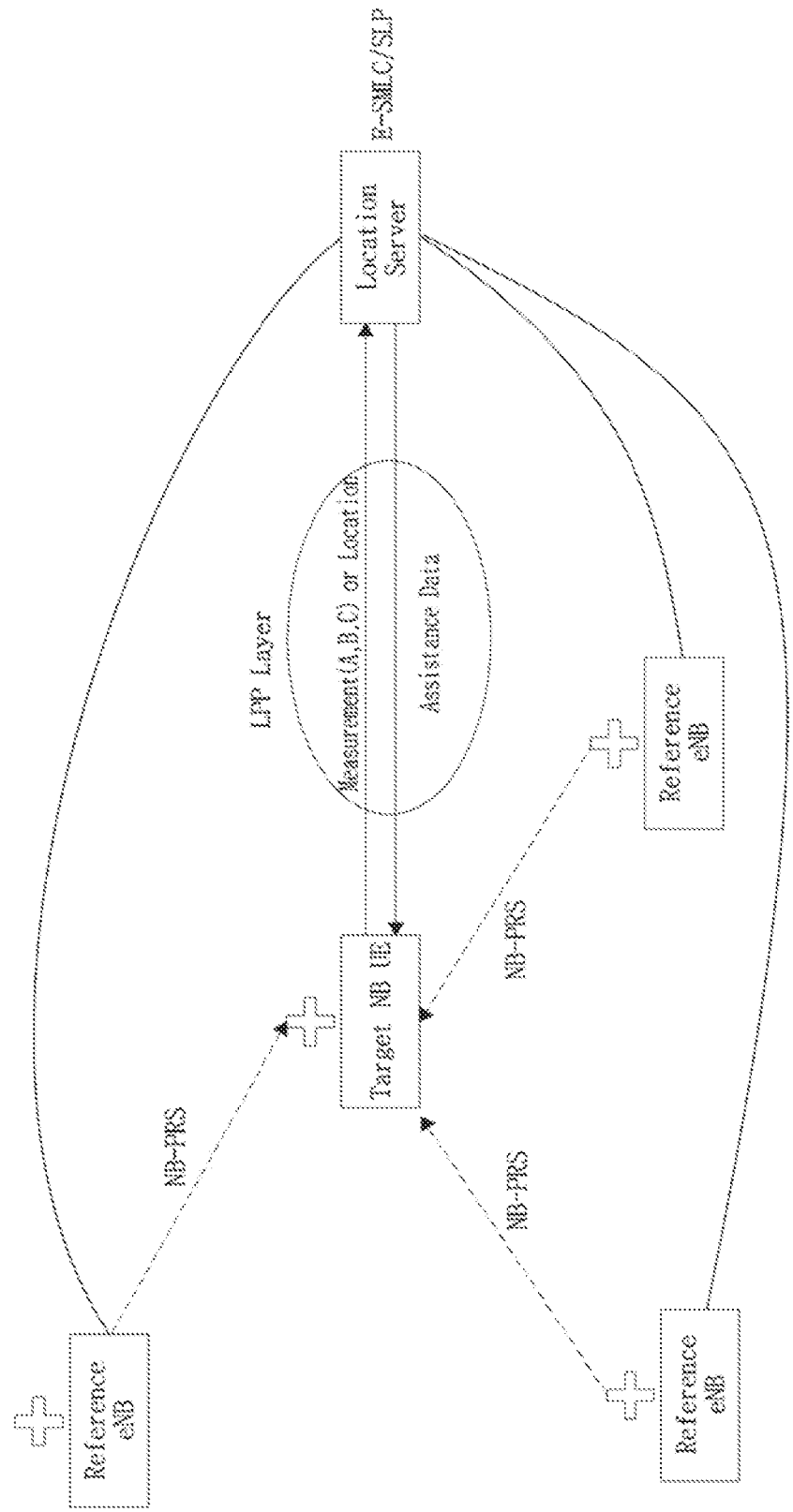
FIG. 15 is a diagram illustrating a control plane and a user plane of an LTE positioning protocol (LPP).

FIG. 15 is a diagram illustrating a control plane and a user plane of an LTE positioning protocol (LPP).

The positioning technology may be defined by an Enhanced Cell ID (E-CID), Observed Time Difference of Arrival (OTDOA), a Global Navigation Satellite System (A-GNSS), and the like, which are capable of supporting positioning solutions for a control plane and a user plane at the same time. An LTE network-based positioning function is managed by an Evolved-Serving Mobile Location Centre (E-SMLC)/Secure User Plane Location (SUPL) Location Platform (SLP).

Next, examples associated with an NB-PRS will be described.

First, the definition of an NB-PRS and a positioning operation based on an LTE PRS and an NB-PRS will be described.

The NB-PRS is defined only for a subcarrier space of 15 kHz (i.e., $\Delta f = 15$ kHz).

The NB-PRS may be transmitted only in a downlink subframe configured for NB-PRS transmission (hereinafter, an NB-PRS transmission subframe) through higher layer signaling. Detailed examples associated with the configuration of NB-PRS transmission subframes will be described later.

An eNB operating in NB-IoT does not configure an MBSFN subframe for a UE operating in NB-IoT (hereinafter an NB UE), and thus, the NB UE may operate without information associated with an MBSFN subframe even in an in-band operation mode. When the NB UE is defined to support only a normal CP, the NB UE may operate in a subframe configured as an NB-PRS transmission subframe by always assuming that the normal CP is applied, irrespective of the existence of an MBSFN subframe that the NB eNB is aware of (i.e., that the NB UE is not aware of). In a guard-band operation mode or an out-band operation mode, an MBSFN subframe does not exist, and thus the NB UE may operate without information associated with the MBSFN subframe.

The NB eNB may be capable of supporting both a normal LTE UE and an NB UE (i.e., a UE in the LTE in-band and guard-band operation mode).

It is assumed that the NB UE supports only an NB-IoT function. Therefore, it is assumed that the NB UE may not be aware of all operations including cell-specific information and the UE-specific information of normal LTE UEs. Therefore, to report the cell-specific information and the UE-specific information to the NB UE, NB-IoT signaling may be used separately.

Next, the definition of an antenna port of an NB-PRS and its new signaling scheme will be described.

An antenna port of an NB-PRS may be the same as the antenna port of an LTE PRS (i.e., antenna port index 6), or may be independent from the antenna port of the LTE PRS. The configuration of the NB-PRS antenna port (the configuration indicating whether an NB-PRS antenna port is the same as an LTE PRS antenna port) may be provided to the NB UE through higher layer signaling, or may be determined in advance as a fixed value so that the UE may know in advance without separate signaling.

When an NB-PRS is configured to be transmitted through the same antenna port as that of an LTE PRS, through higher layer signaling, the NB UE may use both the NB-PRS and the LTE PRS (e.g., may use both the NB-PRS and the LTE PRS for generating positioning information (e.g., RSTD)). When the configuration indicates that the NB-PRS and the LTE PRS have the same antenna port, the channel information estimated based on an NB-PRS of a neighboring RE and the channel information estimated based on an LTE PRS of another RE may be used for channel estimation of an RE. That is, the performance of channel estimation may be increased by combining channel information estimated by different types of reference signals, and thus, the positioning performance may be increased.

For example, when the NB-PRS and the LTE PRS use the same antenna port, the NB UE may use both the channel information estimated using the NB-PRS and the channel information estimated using the LTE PRS to generate positioning information (e.g., RSTD) in a subframe where an NB-PRS occasion and an LTE PRS occasion overlap according to the configurations of the NB-PRS occasion and the LTE PRS occasion. Alternatively, the NB UE may generate positioning information estimated by assuming an NB-PRS as an LTE PRS. In the subframe where the occasions overlap, the NB UE may need to be aware of the LTE PRS sequence and pattern information in advance to receive an LTE PRS. The information may be set in advance or may be provided by an NB eNB.

When an antenna port, which is different and independent from the antenna port of an LTE PRS, is configured for an NB-PRS through higher layer signaling, the NB UE may generate positioning information (e.g., RSTD) using only the NB-PRS without using the LTE PRS.

Alternatively, when higher layer signaling associated with the configuration of an NB-PRS antenna port is not provided to the UE, the NB UE may assume that the NB-PRS antenna port is independent from that of an LTE PRS, and generates positioning information (e.g., RSTD) using only the NB-PRS without using the LTE PRS.

Additionally or alternatively, a base station may configure the antenna port of an NB-PRS to be the same as or different from the antenna port of an LTE Cell-specific Reference Signal (CRS) (i.e., antenna port index 0, 1, 2, or 3). The antenna port configuration may be performed through higher layer signaling.

For example, when an NB-PRS is configured to be transmitted through the same antenna port as that of an LTE CRS through higher layer signaling, the NB UE may use the LTE CRS in all subframes in which an NB-PRS is received, because the LTE CRS is transmitted in all subframes. Therefore, the NB UE may use channel information estimated using an NB-PRS and channel information estimated using an LTE CRS to generate positioning information (e.g., RSTD).

Additionally or alternatively, higher layer signaling may configure the antenna port of an NB-PRS to be the same as or independent from the antenna port of an LTE Discovery Reference Signal (DRS).

For example, when an NB-PRS is configured to be transmitted through the same antenna port as that of an LTE DRS, through higher layer signaling, the LTE DRS may be transmitted in all subframes configured in advance through higher layer signaling. When the NB UE also receives an LTE DRS in a subframe in which an NB-PRS is received, the NB UE may use the LTE DRS to generate positioning information. Therefore, the NB UE may use channel information estimated using the NB-PRS and channel information estimated using the LTE DRS to generate positioning information (e.g., RSTD). Here, the LTE DRS is a reference signal, which is used for discovering an accessible cell that provides sufficient reception quality out of a plurality of small cells through a smaller amount of power consumed in a small cell environment. The LTE DRS is a reference signal transmitted by small cell eNBs in a relatively long period (e.g., a DRS occasion period configuration). The LTE DRS may be configured with a CRS, a PSS/SSS, and, if configured, a CSI-RS. For example, a single DRS occasion is formed of a plurality of downlink subframes (e.g., 5 subframes); a CRS, a PSS/SSS, and a CSI-RS may be transmitted in some or all of the downlink subframes. Therefore, in the same manner as the CRS/PRS, an indication that enables a DRS and an NB-PRS to have the same antenna port may be provided to the UE through network signaling and thus, the positioning quality may be improved.

Additionally or alternatively, higher layer signaling may configure an antenna port that is the same as or independent from an antenna port of an NPSS or an NSSS, which is used for purpose of synchronization in an NB-IoT system, as an antenna port of an NB-PRS.

One example is the case in which an NB UE is configured through higher layer signaling (e.g., LPP layer or RRC layer) such that an NB-PRS is transmitted using the same antenna port as that of an NPSS or an NSSS. In this case, when the NB UE simultaneously receives an NPSS or NSSS in a subframe in which an NB-PRS is also received, the NB UE may use the NPSS or NSSS together with the NB-PRS to generate positioning information. Here, an NPSS will be transmitted in subframe #5 based on a period of 10 ms in a single radio frame, and an NSSS will be transmitted in subframe #9 based on a period of 20 ms in a single radio frame, and thus, the NPSS or the NSSS may overlap or may be adjacent to a subframe and a time domain where the NB-PRS will be transmitted. Therefore, when the configuration indicates that the NB-PRS and the NPSS or NSSS are using the same antenna port, it means that both the channel information estimated based on an NB-PRS of a neighboring RE and the channel information estimated based on an NPSS or NSSS of another RE may be used for channel estimation of an RE. That is, the performance of channel estimation may be increased by combining channel information estimated by different types of reference signals, and thus, positioning performance may be improved.

Additionally or alternatively, an antenna port that is the same as or independent from an antenna port of a Narrowband Reference Signal (NRS), which is used for purpose of decoding a Narrowband Physical Downlink Shared Channel (NPDSCH) in an NB-IoT system, may be configured as an antenna port of an NB-PRS through higher layer signaling.

Upon receiving the higher layer signaling, a UE may assume that NRS port #0 is configured as an antenna port which is the same as that of the NB-PRS. Conversely, directly configuring a predetermined NRS antenna port as an antenna port that is the same as that of an NB-PRS for a UE is allowed through additional higher layer signaling.

For example, when it is configured, through higher layer signaling, that an NB-PRS and an NRS are transmitted using the same antenna, the configured NRS antenna port may be used by a UE in a subframe in which an NPDSCH is transmitted, and thus, this may not overlap a subframe in which an NB-PRS is transmitted. Therefore, a UE for which an NB-PRS and an NRS are configured to be transmitted in the same antenna port through higher layer signaling, may improve the reliability of positioning information by securing an NB-PRS transmission subframe and an NPDSCH transmission subframe with an NRS to be performed contiguously from the perspective of time.

An NB-PRS sequence may be generated based on a PRB index corresponding to a center value of the total number of PRBs that an NRS assumes.

Therefore, the NB-PRS sequence may be generated based on the above described assumption, irrespective of a PRB through which an NB-PRS is to be transmitted, in the same manner as an NRS.

Higher layer configuration information associated with the antenna port of an NB-PRS may included in a Master Information block-Narrow Band (MIB-NB) and may be provided to UEs through a Narrow band PBCH (NPBCH), or may be included in a System Information Block (SIB) and may be provided to UEs through a Narrow band PDSCH, or may be provided to UEs through dedicated RRC signaling or LPP signaling.

Hereinafter, the operations of an NB UE for receiving an NB-PRS and an LTE PRS will be described.

First, the case of the in-band operation mode will be described.

In addition to the configuration associated with the AP of an NB-PRS as described above, the NB eNB may perform configuration such that NB-PRS transmission overlaps LTE PRS transmission in the time resource, the frequency resource, or the time-frequency resources. The NB eNB may configure LTE PRS and NB-PRS transmission resources based on a decrease in LTE PRS/NB-PRS overhead in a system or cell, more flexible LTE PRS/NB-PRS occasion, an LTE PRS/NB-PRS transmission subframe, an LTE PRS/NB-PRS PRB pair configuration, efficiency of utilizing frequency resources, and the like.

Figure 16:
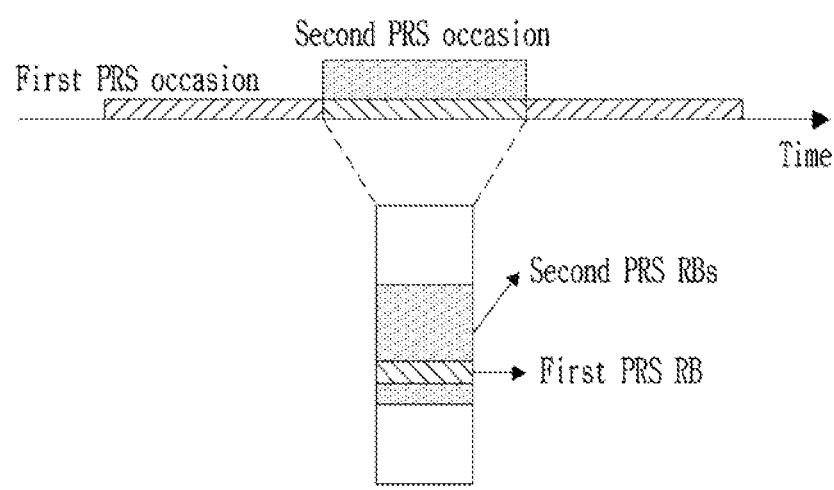
FIG. 16 is a diagram illustrating an example of a first PRS transmission resource and a second PRS transmission resource.
Figure 17A:
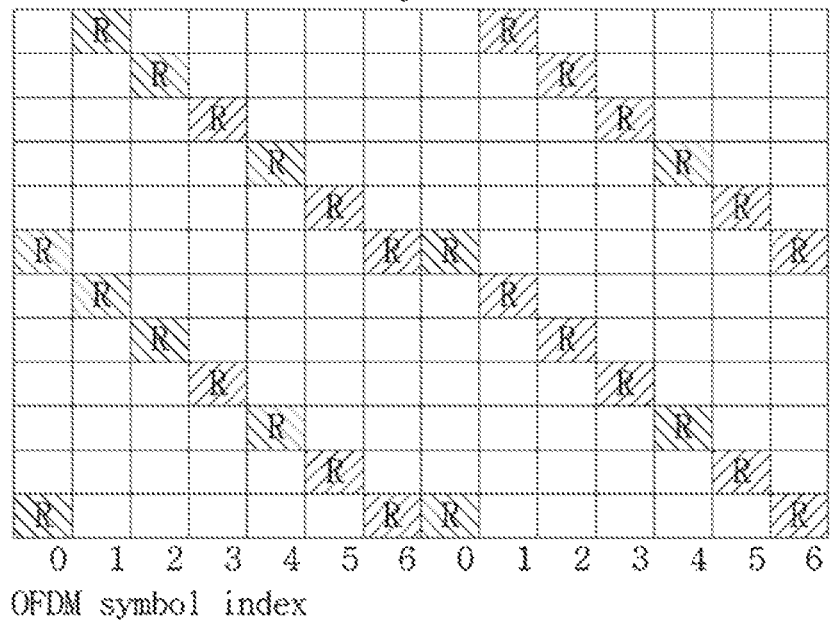
FIGS. 17A, 17B, 18A, 18B, 19A, 19B, and 20 are diagrams illustrating an NB-PRS RE mapping pattern in a guard-band or a standalone operation mode.
Figure 17B:
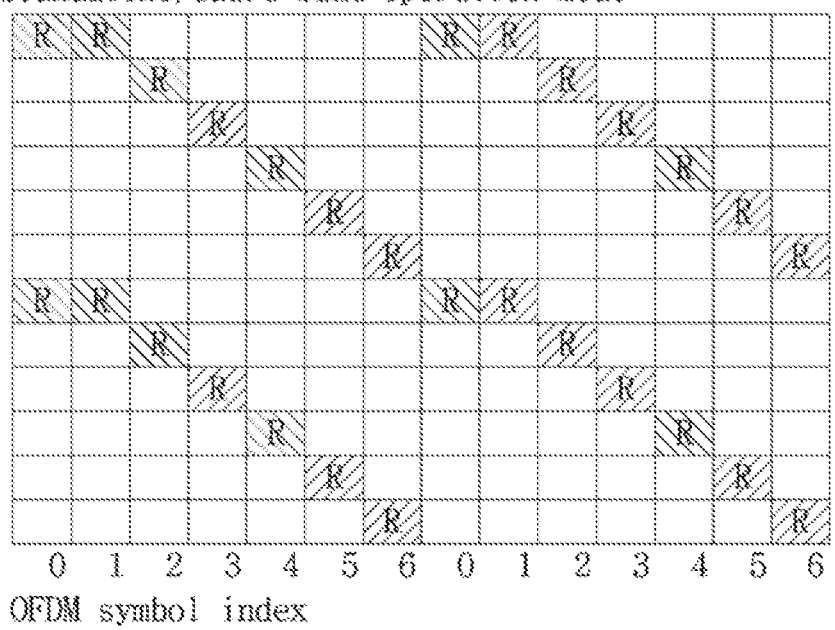
Figure 18A:
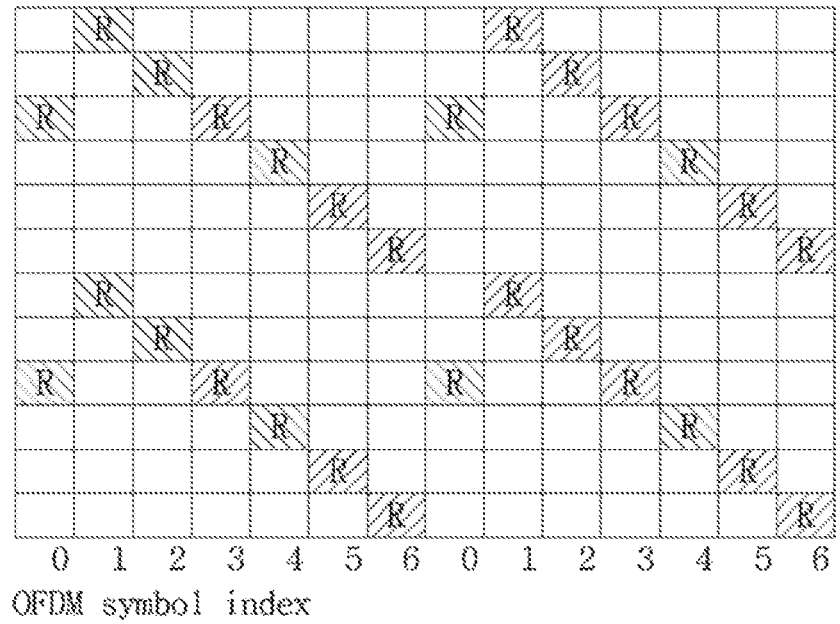
Figure 18B:
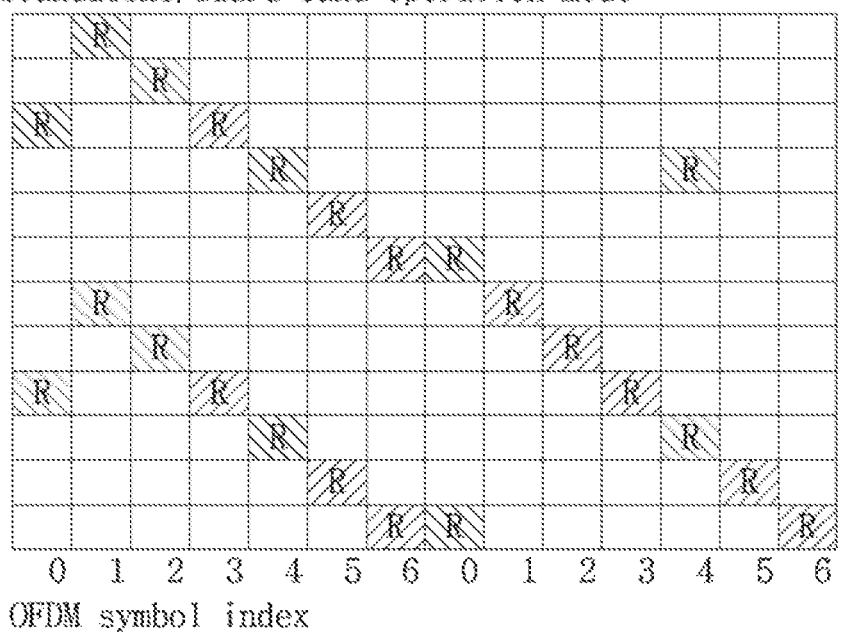
Figure 19A:
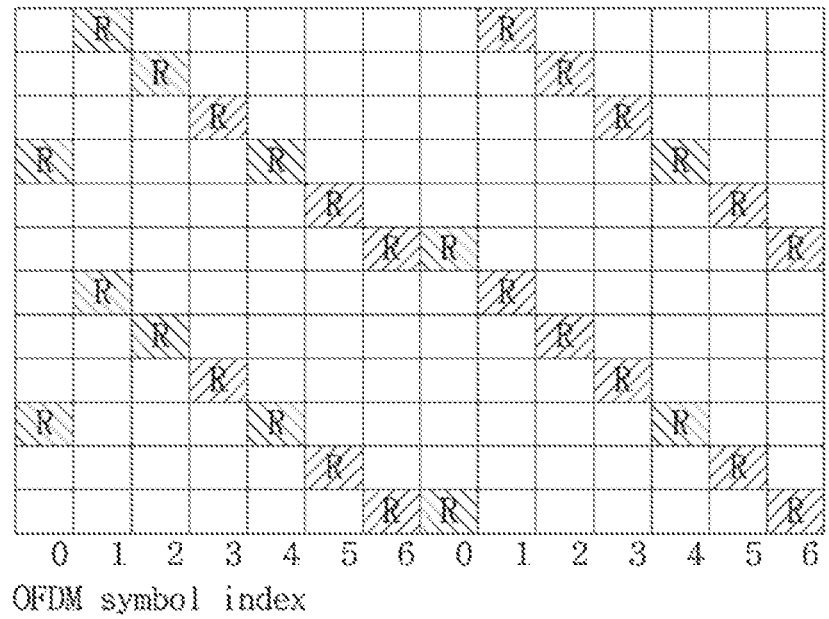
Figure 19B:
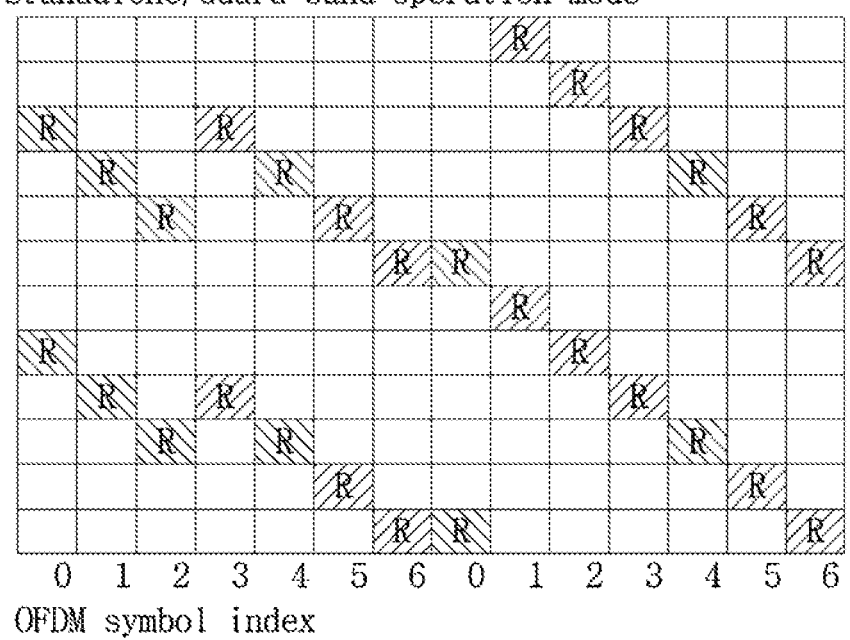
Figure 20:
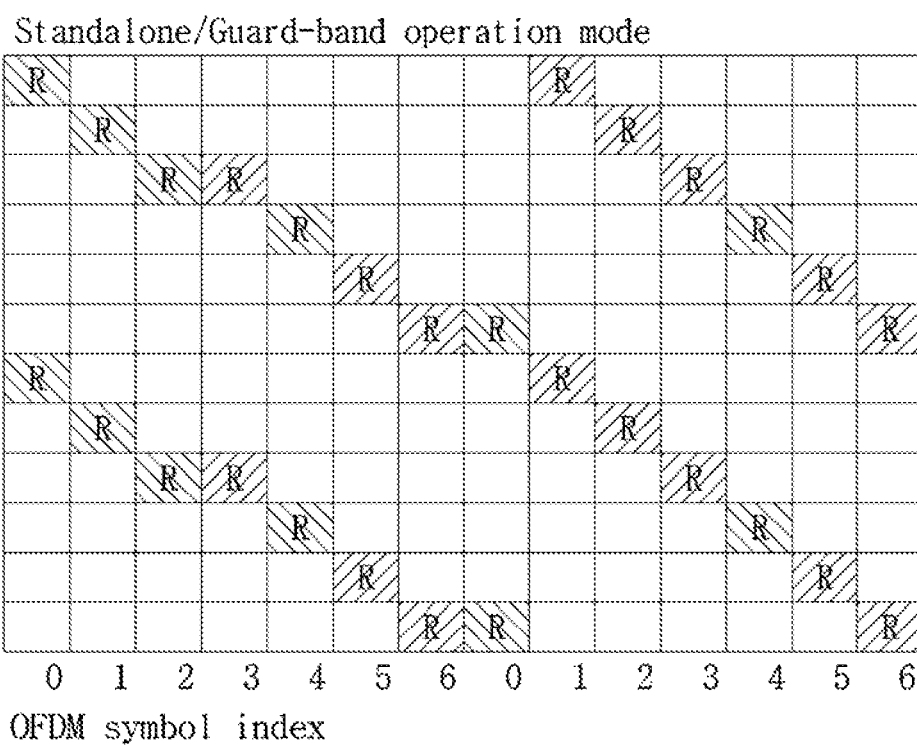

FIG. 16 is a diagram illustrating an example of a first PRS transmission resource and a second PRS transmission resource.

In the example shown in FIG. 16, a first PRs (e.g., NB-PRS) transmission RB (or PRB) and a second PRS (e.g., LTE PRS) transmission RBs (or PRBs) may overlap in the time domain and the frequency domain.

In short, sequence generation and a mapping pattern for NB-PRS transmission may be different from sequence generation and a mapping pattern for LTE PRS transmission. In this instance, to support reverse compatibility associated with an LTE PRS, an NB UE may receive an NB-PRS in a PRB and a subframe in which both NB-PRS transmission and LTE PRS transmission are configured (i.e., where an NB-PRS and an LTE PRS overlap), based on the sequence and the mapping pattern of the LTE PRS. For example, in a PRB (first PRS RB of FIG. 16) and a subframe in which both NB-PRS transmission and LTE PRS transmission overlap as shown in FIG. 16, an NB eNB may apply the sequence and the mapping pattern of an LTE PRS to an NB-PRS, and may transmit the same to the NB UE. Also, although different sequence generation and a different mapping pattern are applied to an NB-PRS in another PRB and subframe where an NB-PRS does not overlap the LTE PRS, the sequence generation and a mapping pattern that are the same as that of an LTE PRS may be applied to the NB-PRS in a PRB (first PRS RB of FIG. 16) and a subframe in which the NB-PRS and the LTE PRS overlap. That is, although it is an NB-PRS subframe, an eNB may transmit an LTE PRS instead, in a PRB and a subframe where the NB-PRS and the LTE PRS overlap. This may enable LTE UEs to maintain reverse compatibility. Accordingly, the NB UE may generate positioning information (e.g., RSTD) based on an LTE PRS instead of an NB-PRS in a PRB and a subframe where the NB-PRS and the LTE PRS overlap (i.e., assuming an LTE PRS as an NB-PRS). The example may be applied to the case in which the antenna port of an LTE PRS is the same as the antenna port of an NB-PRS, and to the case in which they are independent from each other.

In particular, although an NB UE is not aware of system information including cell-specific information and UE-specific information for normal LTE UEs, if the NB UE receives information indicating whether an LTE Cell ID and an NB-IoT Cell ID are identical, LTE CRS sequence information (including PRB index information (i.e., information for recognizing a sequence in a predetermined PRB out of an LTE CRS sequence mapped to the entire band)), and the like through an NPBCH (or MIB-NB), and if the NB UE obtains an NB-IoT Cell ID through a Narrow band SSS (NSSS), the NB UE may expect that an LTE-PRS based on LTE-PRS sequence generation and a mapping pattern on the basis of the above described information is received when an NB-PRS transmission resource and an LTE-PRS transmission resource overlap.

Table 5 provided below shows an example of the configuration of an MIB-NB information element.

TABLE 5

```
-- ASN1START
MasterInformationBlock-NB :: = SEQUENCE {
    systemFrameNumber-MSB-r13  BIT STRING (SIZE (4)),
    hyperSFN-LSB-r13   BIT STRING (SIZE (2)),
    schedulingInfoSIB1-r13  INTEGER (0.. 15)),
    systemInfoValueTag-r13  INTEGER (0..31)),
    ab-Enabled-r13   BOOLEAN
    channelRasterOffset-NB-r13
    operationModeInfo-r13   CHOICE {
        inband-SamePCI-r13   Inband-SamePCI-NB-r13
        inband-DifferenctPCI-r13  Inband-DifferentPCI-NB-r13,
        guardband-r13   Guardband-NB-r13
        standalone-r13   Standalone-NB-r13
    },
    Spare     BIT STRING (SIZE (11))
}
```

In Table 5, systemFrameNumber-MSB-r13 denotes a field indicating an SFN. hyperSFN-LSB-r13 denotes a field indicating two Least Significant Bits (LSB) of HyperSFN. schedulingInfoSIB1-r13 denotes a field indicating scheduling information of SIB1. systemInfoValueTag-r13 denotes a field indicating common information of SIBs excluding an MIB and SIB4/16. ab-Enabled-r13 denotes a field indicating that access barring is applied when the value is TRUE. channelRasterOffset-NB-r13 denotes a field including offset information between an LTE channel raster and an NB-IoT central frequency. NB-IoT uses an LTE channel raster that appears for each 100 kHz in an in-band mode that utilizes an LTE frequency band; thus, offset information associated with a frequency interval between the LTE channel raster and with the central frequency of an PRB (or carrier) where the NB-IoT is operated may be required.

Also, the operationModeInfo-r13 field may selectively include one out of the four modes, inband-SamePCI, inband-DifferenctPCI, guardband, and standalone. Here, the inband-SamePCI-r13 field corresponds to an in-band operation mode having the same Physical Cell ID (PCID) as that of LTE, and may provide CRS sequence information (including PRB index information) so that an LTE CRS is utilized. Also, the inband-DifferenctPCI-r13 field corresponds to an in-band operation mode having a PCID different from that of LTE, and may additionally provide the number of LTE CRS APs and raster offset information. Also, the guardband-r13 and standalone-r13 fields indicate a guard-band operation mode and a standalone operation mode, respectively.

Here, PRB index indication information for providing LTE CRS sequence information may be reused to obtain LTE PRS sequence information (i.e., indicating the location of a PRB where an LTE PRS is transmitted in the entire system band). Accordingly, although an NB UE may not be directly aware of the configuration information associated with an LTE PRS (sequence generation, a mapping pattern, a frequency location, a transmission subframe configuration, and the like), the NB UE may infer the LTE PRS sequence information from other information as described above, and may receive the LTE PRS in an NB-PRS occasion.

Also, as described in FIG. 12, the NB UE may infer an LTE PRS pattern that is different based on the number of PBCH antenna ports (i.e., the number of CRS antenna ports), and may receive an LTE PRS. When the NB-IoT Cell ID is the same as the LTE Cell ID, the number of PBCH antenna ports may be signaled by an eNB, or the UE may assume that the number of PBCH antenna ports is the same as that of an Narrow Band Reference Signal (NB-RS). Essentially, the NB UE determines the number of NB-RS antenna ports in a process of receiving an NPBCH, and thus, the NB UE may assume that the determined number of NB-RS antenna ports is the same as the number of LTE PBCH antenna ports. When the NB-IoT Cell ID is different from the LTE Cell ID, the number of LTE PBCH antenna ports may be indicated by an NPBCH as shown in Table 5. The NB-RS is transmitted together with downlink channels, such as an NPBCH, an NPDCCH, an NPDSCH, and the like in an NB-IoT system, to demodulate the corresponding channels.

When the NB-IoT Cell ID is different from the LTE Cell ID, LTE Cell ID information may be additionally provided to the NB UE, and may be used for determining an LTE PRS sequence. The NB UE only knows that the Cell ID value is different from that of LTE but does not know the accurate value of an LTE PCID, and thus, additional LTE Cell ID information needs to be provided to determine the LTE PRs sequence information. The additional information may be provided to the NB UE through higher layer signaling (e.g., LPP layer signaling).

Additionally, on the assumption that the NB UE is capable of receiving both an NB-PRS and an LTE PRS, the NB UE may generate positioning information (e.g., RSTD) based on channel information estimated using both the NB-PRS and the LTE PRS even when an NB-PRS transmission subframe or a PRB does not overlap an LTE PRS transmission subframe or a PRB. For example, when the NB UE operates in an in-band operation mode, and an NB-PRS occasion and an LTE PRS occasion do not overlap, channel information estimated by different PRSs in different subframes may be combined. To this end, the configuration that enables the antenna information of an NB-PRS and an LTE PRS to be the same may be effectively used. In particular, the calculation of an RSTD uses channel state information estimated successively in one or more configured subframes, and thus, the accuracy of positioning information of the NB UE may be improved when different PRSs in different subframes are combined.

Subsequently, the sequence of an NB-PRS may be generated based on Equation 1 and Equation 2. Here, it is defined that NB-IoT supports only the normal CP, and thus, the case of the extended CP of Equation 2 may not be considered. However, examples may not be limited thereto, and may include the case in which the NB-IoT supports the extended CP.

An RE mapping pattern in an RB pair in a subframe of an NB-PRS may be determined based on Equation 3 and Equation 5. Here, $N^{PRS}_{RB}$ denotes the bandwidth of an LTE PRS. In the case of an NB-PRS, only one PRB is used. $N^{PRS}_{RB}$ in Equation 3 is replaced with 1, and it is defined that m=0, 1 and m'=m+$N^{max,DL}_{RB}$−1. Equation 6 summarizes this below. RE mapping patterns (e.g., FIGS. 17A, 17B, 18A, 18B, 19A, 19B, and 20) that may be applied to a guard-band operation mode or a standalone operation mode may use only a single PRB in the same manner as an in-band operation mode, but may have different time-frequency locations from that of the RE mapping pattern of the in-band operation mode. Therefore, the NB-PRS patterns of the guard-band operation mode or the standalone operation mode may be expressed to be similar to Equation 6, but may be expressed by setting different values for k (frequency RE index) and I (OFDM symbol index) in Equation 6.

[Equation 6]

$$a^{(p)}_{k,l} = r_{l,n_s}(m')$$

$$k = 6(m + N^{DL}_{RB} - 1) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1$$

$$m' = m + N^{max,DL}_{RB} - 1$$

Since it is defined that NB-IoT supports only the normal CP, the NB-PRS mapping pattern may not consider the case of the extended CP of Equation 4. However, examples may not be limited thereto, and may include the case in which the NB-IoT supports the extended CP. In this instance, $N^{PRS}_{RB}$ of Equation 4 may be replaced with 1.

Here, in the NB-PRS sequence generation and mapping pattern determination, $N^{Cell}_{ID}$ from Equations 2 and 5 may be replaced with $N^{NCell}_{ID}$ which is the value of an NB-IoT Cell ID. When the NB eNB indicates that the LTE Cell ID and the NB-IoT Cell ID are the same, $N^{Cell}_{ID}$ and $N^{NCell}_{ID}$ may be set to be the same.

FIGS. 17A, 17B, 18A, 18B, 19A, 19B, and 20 are diagrams illustrating an NB-PRS RE mapping pattern in a guard-band operation mode or a standalone operation mode.

NB-IoT is capable of operating in three operation modes, the in-band, the guard-band, and the stand-alone operations. Three operation modes may be included in the MIB-NB information transferred by an NPBCH and may be provided to all NB UEs in a cell based on a cell-specific scheme.

In the guard-band operation mode and in the standalone operation mode, a legacy LTE PRS pattern that is defined in a single subframe and a single PRB (180 kHz) is not used as is; instead, a new NB-PRS pattern may be used. Unlike the in-band operation mode, an LTE control region and a CRS transmission do not exist in time-frequency resources where the guard-band operation mode or the standalone operation mode is applied. That is, the LTE PRS pattern is designed based on the assumption that a control region and a CRS always exist, and thus, an LTE PRS is not allocated in the control region and a CRS transmission OFDM symbol.

The NB-PRS pattern of the guard-band operation mode and the standalone operation mode may consider the allocation of a new NB-PRS pattern to a new OFDM symbol region in the LTE PRS pattern. Also, in the NB-PRS pattern, a frequency reuse factor 6 (i.e., v_shift=NB_PCID mod 6) is maintained; a delay spread generated in an indoor channel environment (i.e., rich-multipath scenario) may further increase a side-lobe value during the estimation of a Time of Arrival (TOA) of a UE, and thus, more uniform NB-PRS allocation may be considered in view of the frequency domain. Information associated with whether the NB_PCID is the same as an LTE_PCID is provided through higher layer signaling (e.g., MIB-NB). When the NB_PCID is different from the LTE_PCID, a value provided by an NSSS is used as the value of the NB_PCID and the number of CRS ports may be provided by the MIB-NB as LTE CRS information. Here, although the LTE_PCID and the NB_PCID are different from each other, the NB eNB may ensure that the value of v_shift indicated by the LTE_PCID is the same as the value of v_shift indicated by the NB_PCID derived from the NSSS.

Figure 21:
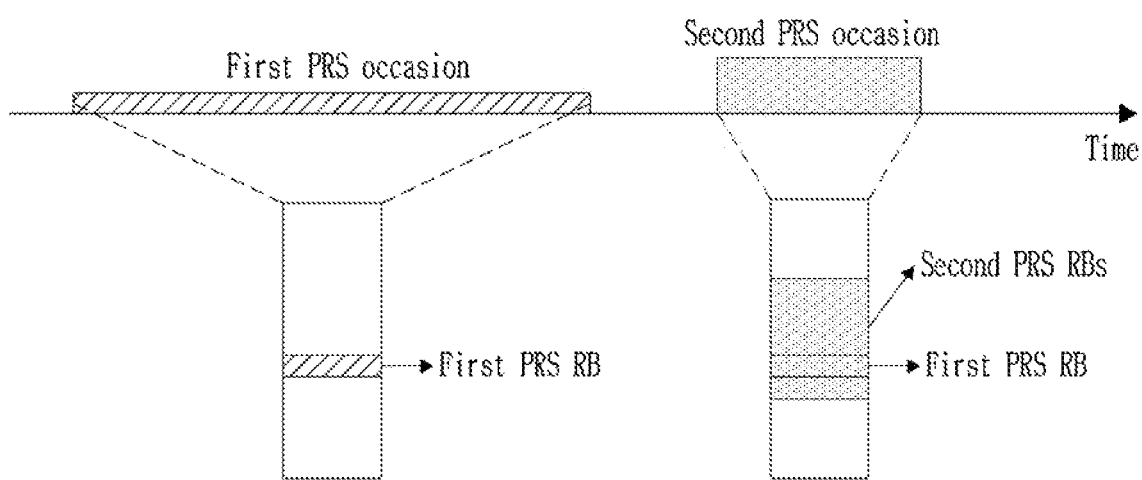
FIGS. 21 and 22 are diagrams illustrating other examples of a first PRS transmission resource and a second PRS transmission resource.

FIG. 21 is a diagram illustrating other examples of a first PRS transmission resource and a second PRS transmission resource.

In the examples shown in FIGS. 17A, 17B, 18A, and 18B, a first PRS (e.g., NB-PRS) transmission RB (or PRB) uses the same resource (e.g., PRB) as that of the second PRS (e.g., LTE PRs) transmission RBs (or PRBs) in the frequency domain, but uses different resources (e.g., subframes) in the time domain. Here, the example in FIG. 21 illustrates that an NB-PRS transmission subframe and an LTE PRS subframe are discontiguous in the time domain, and the example in FIG. 22 illustrates that they are contiguous.

As described above, an NB UE may be provided with information associated with an LTE PRS occasion and a related configuration in addition to configuration information associated with an NB-PRS, from an NB eNB through higher layer signaling. The examples shown in FIGS. 16 and 21 assume that an NB-PRS configuration and an LTE PRS configuration are independently provided from an LPP layer.

In the example shown in FIG. 22, a configuration associated with an NB-PRS occasion (e.g., an NB-PRS period and an offset) may be provided to an NB UE by being associated with a configuration associated with an LTE PRS occasion (e.g., an LTE PRS period and an offset, which have been described with reference to Table 3) so that the NB-PRS occasion and the LTE PRS occasion are always contiguously allocated.

Figure 22:
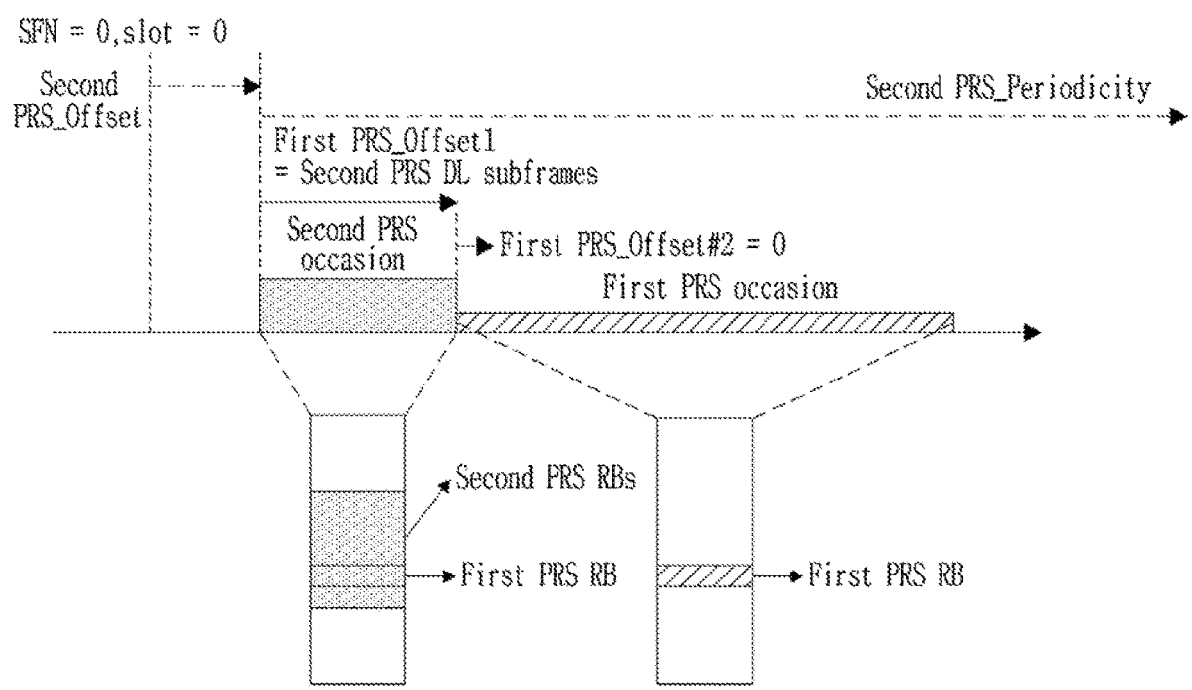

For example, in the example shown in FIG. 22, an offset (Second PRS_Offset) and a period (Second PRS_Periodicity) for configuring an LTE PRS occasion may be provided to a UE. In addition, configuration information associated with the NB-PRS occasion may be provided in the form of the NB-PRS offset value based on the LTE PRS occasion.

For example, the NB-PRS offset may be defined in the form of the difference between the start point of the LTE PRS occasion and the start of the NB-PRS occasion, that is, the form of First PRS_Offset1 in the example shown in FIG. 22. In this instance, when the value of First PRS_Offset1 is given as the number of consecutive downlink subframes of the LTE PRS (the value of $N_{PRS}$ in the descriptions of Table 3), that is, the value corresponding to the second PRS downlink subframes in the example shown in FIG. 22, the LTE PRS occasion and the NB-PRS occasion may be configured to be contiguous.

Alternatively, the NB-PRS offset may be defined in the form of a difference between the end point of the LTE PRS occasion and the start of the NB-PRS occasion, that is, the form of First PRS_Offset2 in the example shown in FIG. 22. In this instance, when the value of First PRS_Offset2 is 0, the LTE PRS occasion and the NB-PRS occasion may be configured to be contiguous.

Alternatively, it may be assumed that the offset value of the LTE PRS occasion and the NB-PRS occasion is determined in advance to be 0, and a UE is aware that the value is 0 even though the value is not separately signaled to the UE. This may indicate that the LTE PRS occasion and the NB-PRS occasion are always allocated to be contiguous.

When the LTE PRS occasion and the NB-PRS occasion are contiguously allocated, as described above, an NB UE may use a larger amount of reception energy to generate a single piece of positioning information (e.g., an RSTD measurement sample value), thereby generating higher quality positioning information. Therefore, when the NB-PRS occasion and the LTE PRS occasion are contiguously allocated, an RSTD measurement sample may be generated in a single occasion including both the NB-PRS occasion and the LTE PRS occasion. Subsequently, this may be considered to be a single sample value for reporting an RSTD.

As described above, when the NB UE is provided with information associated with an LTE PRS configuration in addition to NB-PRS configuration information, an NB UE may perform a positioning operation using both an NB-PRS and an LTE PRS, thereby generating high-quality positioning information.

Therefore, regardless of whether an NB-PRS occasion and an LTE PRS occasion overlap or not, and regardless of whether an NB-PRS transmission PRB and an LTE PRS transmission PRB overlap or not, when an NB UE is provided with LTE PRS configuration information in addition to NB-PRS configuration information, the NB UE may generate positioning information (e.g., RSTD) using an LTE PRS in the LTE PRS occasion, and may generate positioning information using an NB-PRS in the NB-PRS occasion.

Although the above description has been provided by mainly assuming an in-band operation mode, examples may not be limited thereto, and other examples may be applied to the guard-band operation mode or the standalone operation mode. For example, the NB UE may generate positioning information using all of an NB-PRS transmitted in the guard-band operation mode, an LTE PRS transmitted on a carrier band that the corresponding guard-band belongs to, and/or an LTE PRS transmitted on another carrier (i.e., combining channel information estimated based on the NB-PRS and channel information estimated based on the LTE PRS). In the same manner, the NB UE may generate positioning information using all of an NB-PRS transmitted in the standalone operation mode, an LTE PRS transmitted on another carrier (i.e., combining channel information estimated based on the NB-PRS and channel information estimated based on the LTE PRS). Accordingly, the NB UE may further improve positioning quality when compared to the case of using only an NB-PRS.

Here, an inter-carrier positioning operation (e.g., measuring an RSTD) may be applied when a plurality of carriers are configured for a UE (i.e., when data transmission/reception between an eNB and a UE is performed on a plurality of carriers).

Next, examples associated with a NB-PRS transmission subframe configuration will be described. Subsequently, examples associated with an operation when an NB-PRS subframe overlaps another NB channel, signal, or configuration will be described. Hereinafter, it is assumed that an NB-PRS transmission subframe configuration operates on all valid subframes. A subframe that may be considered an NB-PRS transmission subframe in an NB-IoT system will be described later. Therefore, it is assumed that the following subframe configuration is applied to only valid subframes, and a valid subframe may be indicated based on a valid subframe configuration for NB-IoT. When the configuration does not exist, subframes remaining after excluding a subframe in which an NPBCH, an SIB1, an NPSS, or an NSSS is transmitted may be considered valid subframes. The following proposed NB-PRS occasion and subframe configuration may be applied based on the above-described configuration of the valid subframes.

NB-PRS transmission subframes may be configured in consideration of NB-IoT requirements, such as extended coverage (e.g., MCL 164 dBm), reduced complexity, a low price, an improved battery life (about 10 years), and the like, as described in Table 1.

In NB-PRS transmission subframes, a unit including one or more consecutive downlink subframes may be expressed as an NB-PRS occasion. Next, the example associated with the number of consecutive downlink subframes forming the NB-PRS occasion will be described.

As described with reference to Table 3 and Table 4, the LTE PRS occasion may be formed of 1, 2, 4, or 6 (i.e., $N_{PRS}$ or numDL-Frames) consecutive downlink subframes. The number of consecutive subframes for the LTE PRS occasion may be defined considering the fact that an LTE PRS uses 6, 15, 25, 50, 75, 100 PRBs (i.e., prs-Bandwidth), . . . , or the like.

An NB IoT system operates in essentially one single PRB (e.g., a frequency domain of 180 kHz bandwidth). Accordingly, even given power boosting, the NB IoT system may consider allocating a larger number of transmission subframes for an NB-PRS when compared to an LTE PRS, in order to secure sufficient positioning performance in an indoor channel environment. That is, to enable the UE to obtain sufficient NB-PRS reception energy and to generate positioning information (e.g., RSTD), a sufficiently large amount of time resources (i.e., subframes) may be allocated for NB-PRS transmission to compensate for frequency resources, which are limited to a single PRB.

Table 6 provided below shows candidates for the number of consecutive downlink (DL) subframes (Num_DL_subframe) for an NB-PRS. Here, the value of Num_DL_subframe denotes the number of one or more consecutive downlink subframes forming a unit, which is referred to as an NB-PRS transmission window. For example, when an NB-PRS transmission window is the size of a single radio frame, Num_DL_frame may indicate the number of one or more consecutive downlink subframes. Each NB-PRS occasion may be configured to correspond to a duration in which the NB-PRS transmission window is repeated R times.

Here, the set of the candidates for an R value may be defined as {1, 2, 4, 8, 16, 32, 64, 128, 256, 512, 1024, 2048 . . . }, and the R value may be set to one of the candidates in the set. Alternatively, the R value may not be defined (e.g., it may be defined in advance that R=1, and the NB-PRS transmission window may not be defined), and a single NB-PRS occasion may be indicated using only a Num_DL_subframe configuration.

Also, the values shown in Table 6 provided below may be candidate values for Num_DL_subframe, and some of them may not be used.

TABLE 6

| Num_DL_subframe | Value | Descriptions |
| --- | --- | --- |
| Option 1 | {1, 2, 4, 6} | Set to value equal to NPRS (or numDL-Frames of Table 4) of LTE PRS Configuration of repetitive transmission of NB-PRS transmission window is essential. |
| Option 2 | {12, 24, 36, 72, 144, 288, 576, 1152, 2304 . . .} | Configuration of repetitive transmission of NB-PRS transmission window is allowed. |
| Option 3 | {8, 16, 32, 64, 128, 256, 512, 1024, 2048 . . .} | Configuration of repetitive transmission of NB-PRS transmission window is allowed. |

Here, predetermined subframes may be excluded from the consecutive downlink subframes used for an NB-PRS. The predetermined subframes may be subframes in which downlink transmission associated with some or all of at least an NPBCH, an SIB1, System Information(s) (SI(s)), an NPSS, an NSSS, paging, a DL gap, random access-related transmission, an MBSFN, and a NarrowBand Single Cell Point-To-Multi-point transmission (NB-SC-PTM), exists. Here, three schemes may be considered for excluding the predetermined subframes.

A first exclusion scheme counts subframes remaining after excluding the predetermined subframes as consecutive DL subframes (i.e., Num_DL_subframe subframes), and thus, it is indicated that an NB-PRS transmission may not be performed in the predetermined subframes. Particularly, the first scheme may be applied to some or all of a DL gap and a subframe in which an NPBCH, an SIB1, an NPSS, or an NSSS transmits system information and a synchronization signal.

A second exclusion scheme counts consecutive DL subframes (i.e., Num_DL_subframe subframes) including the predetermined subframes; however, NB-PRS transmission is not actually performed in the predetermined subframes, or counts and performs NB-PRS transmission (i.e., the case in which NB-PRS transmission takes precedence).

A third exclusion scheme does not count subframes, and NPRS transmission is delayed until a subsequent valid subframe. That is, the third scheme excludes a duration that includes the predetermined subframes and delays NB-PRS transmission to a duration when Num_DL_subframe consecutive subframes exist (i.e., the case in which the number of consecutive valid subframes for NB-PRS transmission is Num_DL_subframe).

The detailed examples thereof will be described below regarding the operation when an NB-PRS subframe overlaps another NB channel, signal, or configuration. Therefore, consecutive subframes used herein may not be consecutive if the predetermined subframes are included as subframes or counted in determining the consecutiveness. However, the consecutive subframes also includes the subframes remaining after eliminating the predetermined subframes are arranged consecutively. Also, an NB transmission subframe configuration may be cell-specific configuration (e.g., common to UEs) or UE-specific configuration.

Next, provided are examples associated with configuring NB-PRS transmission subframes using the number of consecutive downlink subframes (Num_DL_subframe) which form a single NB-PRS transmission window and associated with the number of times (R) that the NB-PRS transmission window is repeated.

An NB eNB may provide Num_DL_subframe and an R value to an NB UE. Accordingly, the UE may determine that an NB-PRS occasion is formed of subframes of which the number corresponds to a product of Num_DL_subframe and the R value, wherein Num_DL_subframe is the number of consecutive downlink subframes, and the R value is the number of repetitive transmissions.

The Num_DL_subframe and the R value may be defined as cell-specific information, and may be provided to all NB UEs in a cell by the NB eNB. Alternatively, the Num_DL_subframe and the R value may be defined as UE-specific information to prevent the UE's power consumption. Also, the Num_DL_subframe and the R value may be defined independently for each cell. For example, different Num_DL_subframe and different R values may be set for a reference cell and for a neighboring cell.

Figure 23:
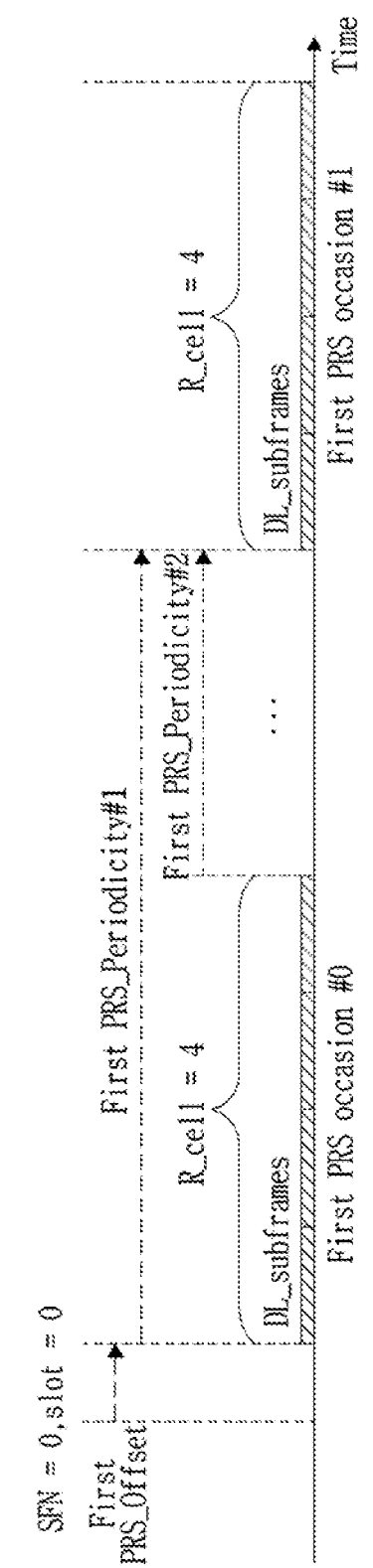
FIGS. 23-25 are diagrams illustrating examples of configuring an NB-PRS occasion.

FIG. 23 is a diagram illustrating an example of configuring an NB-PRS occasion.

A first PRS (e.g., NB-PRS) occasion configuration and a repetitive transmission configuration will be described with reference to the example shown in FIG. 23.

A period and an offset for an NB-PRS occasion may be defined by two schemes.

The first scheme configures a NB-PRS occasion for each period (First PRS_Periodicity#1 of FIG. 23) from a subframe indicated by an NB-PRS offset (First PRS_Offset of FIG. 23) based on SFN=0 and slot=0. According to the second scheme, a first NB-PRS occasion (First PRS occasion #0 of FIG. 23) starts from a subframe indicated by an NB-PRS offset (First PRS_Offset of FIG. 23) based on SFN=0 and slot=0, and a subsequent NB-PRS occasion (First PRS occasion #1 of FIG. 23) starts from a point that is a period (First PRS_Periodicity#2 of FIG. 23) distant from a point where the immediately previous NB-PRS occasion ends. The second scheme may minimize overlap between NB-PRS occasions when compared to the first scheme.

Each NB-PRS occasion may be configured based on the number of consecutive downlink subframes (Num_DL_subframe), which form in a single NB-PRS transmission window, and the number of repetitive transmissions (R), as described above. The example shown in FIG. 23 assumes that DL_subframes corresponds to the number of one or more consecutive downlink subframes that belong to a single NB-PRS transmission window, and R (R_cell of FIG. 23) given as cell-specific information is 4. That is, a single NB-PRS occasion may be configured by repeating a transmission window including DL_subframes subframes four times.

Figure 24:
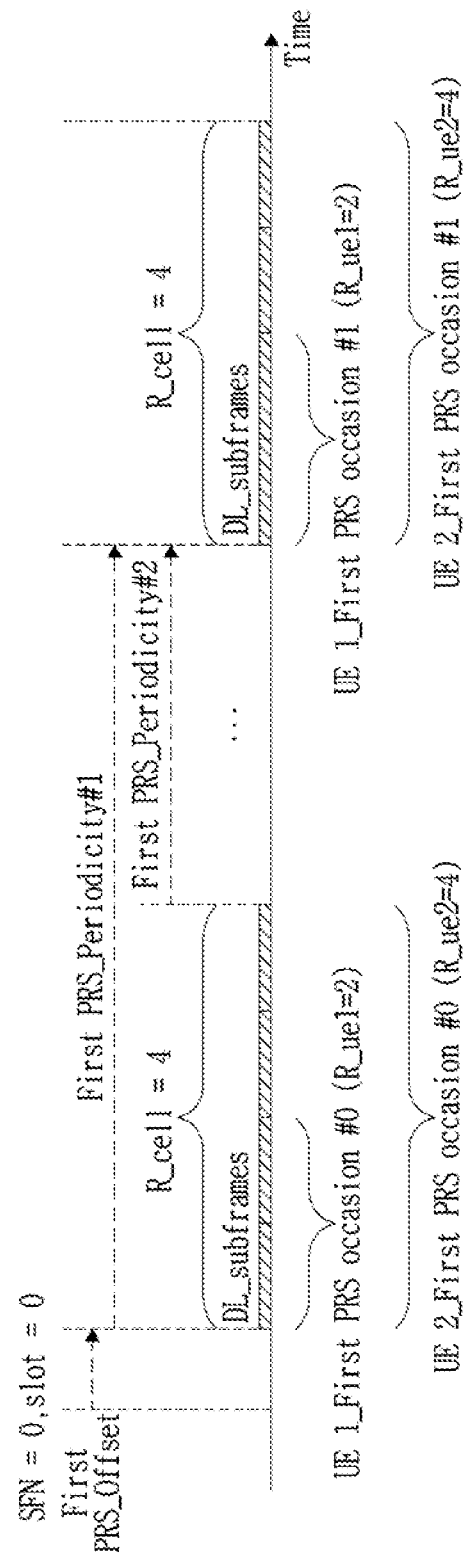

FIG. 24 is a diagram illustrating another example of configuring an NB-PRS occasion.

The configuration of a first PRS (e.g., NB-PRS) occasion will be described from the perspective of an eNB (or cell) and from the perspective of an UE, with reference to the example shown in FIG. 24.

The example in FIG. 24 assumes that Num_DL_subframe, which is a parameter indicating the number of DL_subframes consecutive downlink subframes (e.g., subframes included in an NB-PRS transmission window), is set to be a cell-specific parameter. In the case of R, which is a parameter indicating the number of times that an NB-PRS transmission window is repeated, it is assumed that a cell-specific value and a UE-specific value coexist. For example, as shown in FIG. 24, R_cell=4, which is set as a cell-specific value; R_ue1=2, which is set as a first UE (UE1)-specific value; and R_ue2=4, which is set as a second UE (UE2)-specific value.

In FIG. 24, subframes when DL_subframes consecutive downlink subframes (e.g., NB-PRS transmission window) are repeated R_cell times, may be a first PRS (e.g., NB-PRS) occasion from the perspective of the cell. This may be repeatedly configured according to a predetermined offset and period (e.g., First PRS_Offset and First PRS_Periodicity#1 or First PRS_Periodicity#2). This may be the same as a first PRS (e.g., NB-PRS) occasion configured from the perspective of the second UE (UE2). Meanwhile, a first PRS (e.g., NB-PRS) occasion configured from the perspective of the first UE (UE1) may be formed by repeating DL_subframes two times.

Additionally, the UE-specific NB-PRS configuration may be set to be different for each cell. For example, a UE1-specific NB-PRS configuration may be set in detail a, DL_subframes #0 subframes and R=2 for a reference cell (or serving cell), DL_subframes#1 subframes and R=4 for neighboring cell #1, and DL_subframes #3 subframes and R=3 for neighboring cell #2.

NB UEs may have a normal coverage or an extreme coverage based on a channel environment, an application, a UE capability, and the like. In the example shown in FIG. 24, a first UE (UE1) may be a UE within a normal coverage, and a second UE (UE2) may be a UE belonging to an extreme coverage. An NB-PRS occasion configuration including a large number of repetitive transmissions may be needed for an NB UE that exists in a poor channel environment of an extreme coverage in view of a cell. An NB-PRS occasion for NB UEs within the normal coverage may not need to include a large number of repetitive transmissions; thus, supporting early termination of the NB-PRS occasion may be considered to minimize the power consumption of the NB UEs. That is, through the configuration associated with the number of repetitive transmissions (R) appropriate for a coverage an NB UE exists within and the number of consecutive DL subframes (Num_DL_subframe), the battery power consumed for receiving an NB-PRS and generating positioning information (e.g., RSTD) may be minimized.

From the perspective of the first UE (UE1) within the normal coverage, cell-specific NB-PRS occasion configuration information (e.g., R_cell) may be transparent. The information that is transparent to a UE indicates that the UE is incapable of detecting the information. For example, in a subframe duration, which corresponds to the NB-PRS occasion of the second UE but does not correspond to the NB-PRS occasion of the first UE, an eNB may perform control through scheduling, configuring a DL gap, configuring valid subframes, or the like with respect to the first UE, so that the second UE receives an NB-PRS and performs a positioning operation but the first UE does not perform a positioning operation. Alternatively, when cell-specific NB-PRS occasion configuration information (e.g., R_cell) is not transparent to the first UE, UE-specific configuration information (e.g., R_ue1) may be set to override the cell-specific configuration information.

Figure 25:
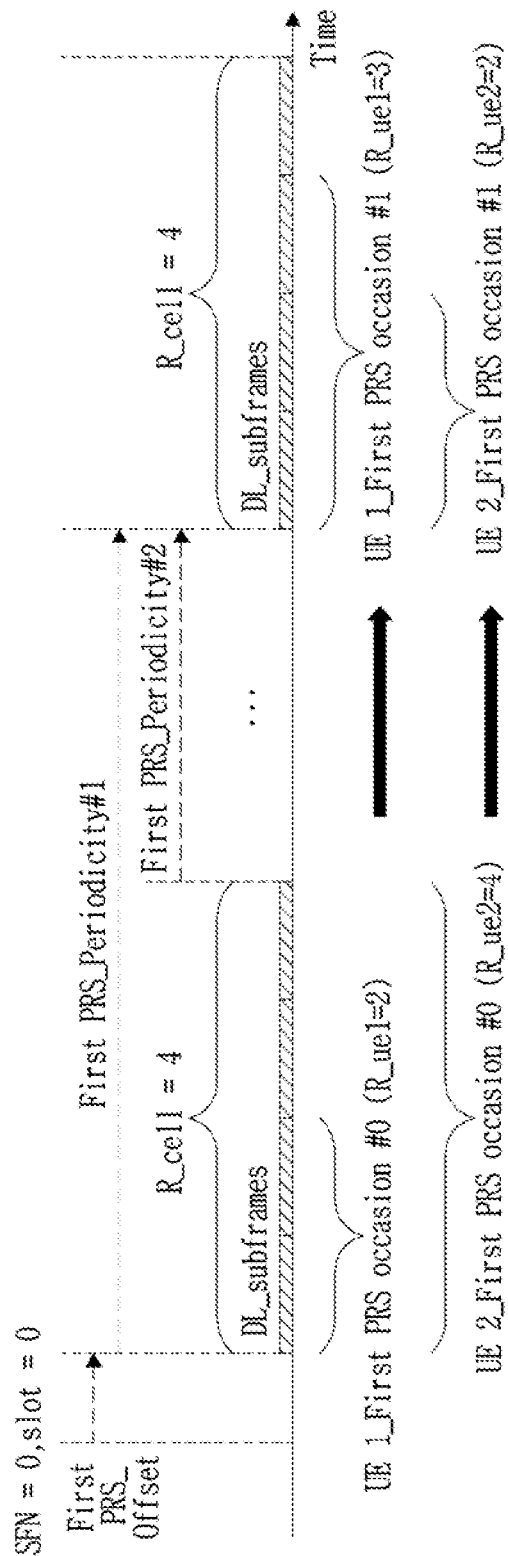

FIG. 25 is a diagram illustrating another example of configuring an NB-PRS occasion.

A scheme will be described for dynamically setting a UE-specific configuration associated with a first PRS (e.g., NB-PRS) occasion, with reference to the example in FIG. 25.

The example shown in FIG. 25 is similar to the example in FIG. 24. However, in the example shown in FIG. 25, a configuration associated with each first PRS occasion (e.g., NB-PRS occasion) (e.g., a configuration associated with DL_subframes and R) may be dynamically signaled to each UE. That is, dynamic signaling may be provided before every NB-PRS occasion, or may be provided at set intervals in a plurality of NB-PRS occasions. Also, the dynamically signaled NB-PRS occasion configuration information may not be limited to a UE-specific R parameter, and the number of consecutive DL subframes may be dynamically changed.

In addition to the NB-PRS subframe configuration, dynamic NB-PRS configuration information, such as an NB-PRS muting pattern, power allocation (including power boosting information), and the like, may be dynamically provided to each cell and/or each UE through a location server (LPP layer) according to a channel environment where a corresponding UE is located or according to the capability of a corresponding UE. The dynamic information may be controlled by the location server to avoid interference to the positioning measurement results of other UEs located in a serving cell or a neighboring cell. Hereinafter, although the descriptions will be provided from the perspective of the dynamical configuration of NB-PRS subframes, the location server may perform signaling for each UE/each cell, so as to control the above described other dynamic configuration information (NB-PRS muting pattern, power allocation, and the like) to be dynamically optimized based on a cell ID (cell) and the channel environment and location of a UE.

In the example shown in FIG. 25, in the case of a first UE (UE1), although the value of the UE-specific repeat count parameter (R_ue1) in a first first-PRS-occasion (UE1_First PRS occasion #0) is set to 2, the value in a second first-PRS-occasion (UE1_First PRS occasion #1) may be dynamically changed to 3. Also, in the case of a second UE (UE2), although the value of the UE-specific repeat count parameter (R_ue2) in a first first-PRS-occasion (UE2_First PRS occasion #0) is set to 4, the value in a second first-PRS-occasion (UE2_First PRS occasion #1) may be dynamically changed to 2.

The example in FIG. 25 increases a signaling overhead when compared to the example in FIG. 24. However, the example in FIG. 25 may support a more flexible NB-PRS transmission/reception operation, reduced battery energy consumption, and more effective resource utilization.

The dynamic NB-PRS configuration may be reported to the location server by each eNB, and an NB-PRS configuration between associated (or neighboring) eNBs may be coordinated and may be dynamically provided to UEs (i.e., the NB-PRS configuration of a UE may be reconfigured).

Next, provided are examples associated with an operation performed when an NB-PRS subframe overlaps another NB channel, signal, or configuration.

NB downlink transmission may include the transmission of an NPBCH, an NPSS, an NSSS, an NPDSCH, a Narrowband PDCCH (NPDCCH), an SIB(s), paging, a random access-related transmission (e.g., Random Access Response (RAR) that responds to a random access preamble), a message indicating the retransmission of an uplink transmission (message 3 (Msg3)) scheduled by an RAR, a contention resolution message (message 4 (Msg4) or the like)), or an NSC-PTM, in addition to NB-PRS transmission. Also, a downlink gap (DL gap) (i.e., a gap configured to enable another UE to use some of a long period of time when an NPDCCH or an NPDSCH for a predetermined NB UE is transmitted during the long period of time) and a valid subframe configuration may be additionally provided for flexible NPDCCH and NPDSCH transmission and scheduling.

The NB channels and signals are repeatedly transmitted using a large amount of time resources, and thus may have a high probability of overlapping (colliding with) NB-PRS transmission. Also, NB-PRS transmission may be restricted by an MBSFN configuration. Also, an NB eNB may intentionally schedule or configure an NB-PRS subframe to overlap another NB channel, signal, or configuration, for effectively utilizing resources and effectively controlling operations of a UE.

Next, provided are examples associated with an operation performed when an NB-PRS subframe overlaps another NB channel, signal, or configuration.

First, a UE may be configured to not expect NB-PRS transmission on a resource where a channel or signal having a higher priority than that of an NB-PRS is transmitted. For example, an NB-PRS may not be allocated to time-frequency resources where an NPBCH, SIB1, NPSS, or NSSS is allocated. Therefore, the UE may determine not to transmit an NB-PRS on a subframe in which an NPBCH, SIB1, NPSS, or NSSS is transmitted. For example, when a subframe configured as an NB-PRS transmission subframe overlaps a subframe in which an NPBCH, SIB1, NPSS, or NSSS is transmitted, the UE may attempt the reception of the NPBCH, SIB1, NPSS, or NSSS, and may not try (or expect) to receive an NB-PRS. That is, a subframe in which at least the channel and signaling is transmitted may not be counted in determining consecutive NB-PRS subframes.

Next, an example of determining an NB-PRS transmission subframe according to a valid subframe configuration will be described. In this section, the valid subframe configuration may be for downlink transmission or for an NB-PRS-dedicated valid subframe configuration.

Downlink subframes corresponding to an NB-PRS occasion may be determined based on the valid subframe configuration. That is, the examples of the NB-PRS subframe configuration, which have been described with reference to Table 6 and FIGS. 23-25, may be applied to subframes that are indicated as or determined to be valid subframes. That is, the examples associated with the above described NB-PRS subframe configuration may be applied to the subframes other than invalid subframes.

Figure 26:
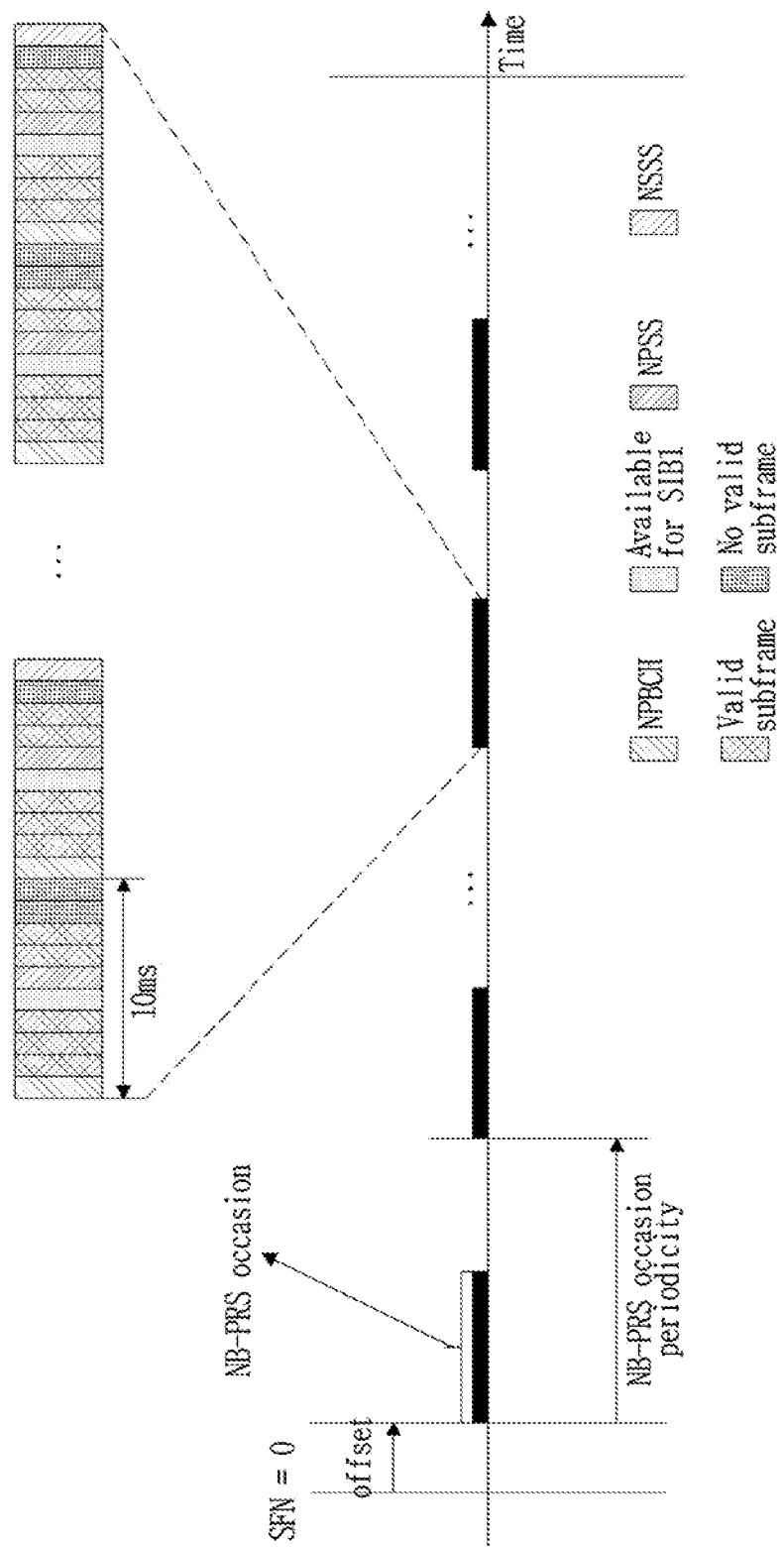
FIG. 26 is a diagram illustrating a valid subframe for an NB-PRS.

FIG. 26 is a diagram illustrating an example of a valid subframe for an NB-PRS.

As illustrated in FIG. 26, an NB-PRS configuration may be applied based on a valid subframe configuration, excluding a subframe in which an NPBCH, SIB1, NPSS, or NSSS is transmitted in a single NB-PRS occasion. That is, a consecutive-NB-PRS-subframe configuration may be only applied to valid subframes.

As another example, an NB-PRS subframe configuration may be applied independently, irrespective of a valid subframe configuration. That is, a subframe that is not configured as a valid subframe may also be configured for NB-PRS transmission through the NB-PRS subframe configuration. The configuration may provide a degree of freedom which is independent from a valid subframe configuration, thereby enabling the effective management among a plurality of cells.

Table 7 provided below illustrates an example of higher layer signaling for a valid subframe configuration for an NB UE. For example, an information element including the fields listed in Table 7 may be referred to as DL-Bitmap-NB, which may be used for defining the set of NB-IoT downlink subframes for downlink transmission. When an NB UE does not receive information associated with a valid subframe configuration (e.g., a DL-Bitmap-NB information element) from an NB eNB, the NB UE may assume that the downlink subframes remaining (after excluding subframes in which an NPBCH, SIB1, NPSS, or NSSS is transmitted) are valid subframes.

TABLE 7

| |
|---|
| -- ASN1START |
| DL-Bitmap-NB-r13 ::= CHOICE{ |
|    subframePattern10-r13      BIT STRING (SIZE (10)) |
|    subframePattern40-r13      BIT STRING (SIZE (40)) |
| } |
| -- ASN1STOP |

In Table 7, subframePattern10 is bitmap information indicating an NB-IoT downlink subframe configuration over a time interval of 10 ms, and may be defined for an in-band operation mode, a guard-band operation mode, and a standalone operation mode. Also, subframePattern40 is bitmap information indicating an NB-IoT downlink subframe configuration over a time interval of 40 ms, and may be defined for an in-band operation mode. A first/the leftmost bit of the bitmap corresponds to subframe #0 that satisfies SFN mod x=0 in a radio frame; x corresponds to a value obtained by dividing a bit string by 10. Therefore, the configuration may be repeatedly applied by a period of 10 ms or 40 ms. "0" in the bitmap indicates that a corresponding subframe is invalid for downlink transmission, and "1" indicates that the corresponding subframe is valid for downlink transmission.

Next, the operation performed when an NPDCCH or NPDSCH transmission subframe overlaps an NB-PRS transmission subframe will be described.

A search space (SS) for an NPDCCH may be configured, by higher layer signaling, to be periodically provided to each UE according to a configuration created by an eNB. The SS for an NPDCCH may indicate a candidate resource region in which an NPDCCH may be transmitted. An NB UE may monitor and attempt to detect the NPDCCH from the configured SS based on a blind decoding scheme. A maximum repetitive transmission configuration associated with an NPDCCH during a single period may be provided by higher layer signaling (e.g., RRC signaling), and a repetitive transmission value to be applied to the UE may be dynamically indicated by DCI signaling in the maximum repetitive configuration.

Table 8 illustrates an example of higher layer signaling for an NPDCCH configuration. In this example, an information element including the fields listed in Table 8 may be referred to as NPDCCH-ConfigDedicated-NB, which may define subframes and resource blocks for monitoring an NPDCCH.

TABLE 8

| | |
|---|---|
| -- ASN1START | |
| NPDCCH-ConfigDedicated-NB-r13 ::= | SEQUENCE { |
| npdcch-NumRepetitions-r13 | ENUMERATED {r1, r2, r4, r8, r16, r32, r64, r128, r256, r512, r1024, r2048, spare4, spare3, spare2, spare1}, |
| npdcch-StartSF-USS-r13 | ENUMERATED {vldot5, v2, v4, v8, v16, v32, v48, v64}, |
| npdcch-Offset-USS-r13 | ENUMERATED {zero, oneEighth, oneFourth, threeEighth} |
| } | |
| -- ASN1STOP | |

The npdcch-NumRepetitions field in Table 8 indicates a maximum repetitive transmission configuration value (1, 2, 4, 7, 16, 32, 64, 128, 256, 512, 1024, 2048, . . . ) for an NPDCCH during a single period. Also, the npdcch-StartSF-USS field indicates the start subframe of a UE-specific search space (USS), and indicates the UE-specific search space which beings from a subframe indicated by a predetermined offset value (npdcch-Offste-USS field) based on the start subframe.

The size and location of the SS for receiving an NPDCCH may be determined based on an aggregation level (AL), the maximum number of repetitive transmissions, and an SS start subframe configuration. When NPDCCHs of various UEs are repeatedly transmitted, the NPDCCHs of the UEs are transmitted by being distinguished in different time resources, that is, by using the Time Division Multiplexing (TDM) scheme. An NPDCCH and an NPDSCH for a single UE may both be transmitted based on a TDM scheme. As described above, in a limited frequency resource (e.g., a single PRB), NPDCCHs for a plurality of UEs and an NPDCCH and an NPDSCH for a single UE are transmitted through the TDM scheme. Therefore, in the time domain, an NB-PRS transmission subframe, which is semi-statically configured by a higher layer, may have a high probability of overlapping an NPDCCH or NPDSCH transmission, which is dynamically scheduled based on whether traffic associated with a UE exists.

As described above, the operation performed when an NPDCCH SS, the repetitive transmission of an NPDCCH, and/or the repetitive transmission of an NPDSCH overlaps an NB-PRS, will be defined as follows.

When the subframe belonging to an NB-PRS occasion overlaps an NPDCCH SS (i.e., a UE-specific search space, that is, a resource region in which an NPDCCH for providing the unicast NPDSCH scheduling information associated with a predetermined UE may be transmitted), an NB UE may expect to receive an NB-PRS.

Alternatively, the NB UE may not actually expect to receive an NB-PRS in a subframe in which an NPDCCH/NPDSCH is repeatedly transmitted for a predetermined purpose (e.g., some or all of paging, SI, SC-PTM, and random access-related transmission). Instead, the NB UE may expect to receive an NB-PRS in a subframe where an NPDCCH/NPDSCH has been configured to be transmitted for the maximum number of repetitive transmissions, but the repetitive transmission of the NPDCCH/NPDSCH does not actually occur.

Figure 27:
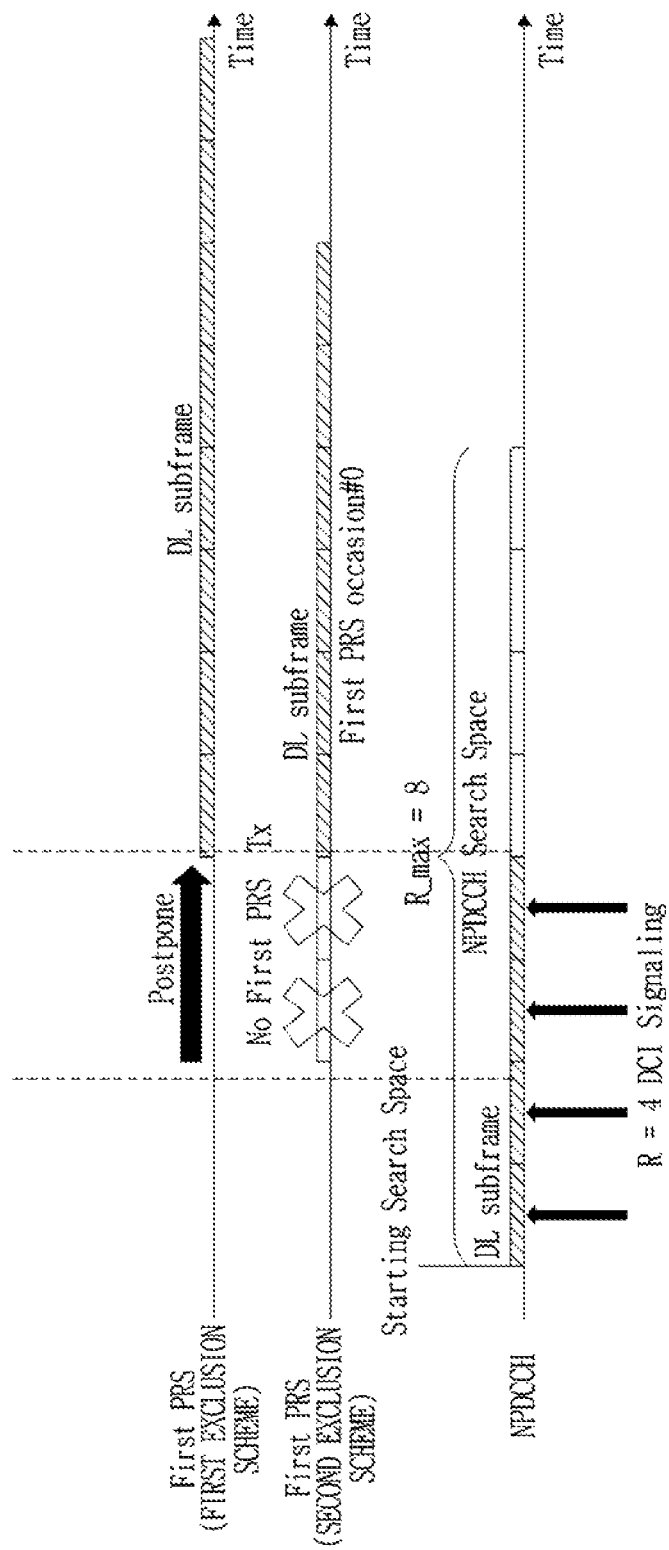
FIG. 27 is a diagram illustrating an NB-PRS transmission operation when an NB-PRS transmission subframe overlaps an NPDCCH transmission subframe.

FIG. 27 is a diagram illustrating an NB-PRS transmission operation when an NB-PRS transmission subframe overlaps an NPDCCH transmission subframe.

The example in FIG. 27 assumes that an NB UE successfully receives an NPDCCH in a subframe ahead of the subframes belonging to an NB-PRS occasion, but subframes in which the transmission of the corresponding NPDCCH is expected (i.e., subframes determined based on the maximum number of an NPDCCH's repetitive transmissions) overlap the subframes belonging to the NB-PRS occasion.

For example, when a value corresponding to the maximum number of repetitive transmissions of an NPDCCH (R_max) is 8, an SS for transmitting an NPDCCH may be configured over a maximum of 8 subframes. Within a range of the maximum value, an NB eNB may signal the R value corresponding to the number of times that an NPDCCH is repeatedly transmitted according to a channel environment of an NB UE, to the UE through DCI. The example in FIG. 27 assumes that, for example, R=4. Therefore, when the NB UE successfully detects only a single NPDCCH while an NPDCCH is repeatedly transmitted four times, the NB UE may determine the end point of the repetitive transmission of an NPDCCH. That is, in the example shown in FIG. 27, when the NB UE successfully detects an NPDCCH in one of the downlink subframes corresponding to R=4 DCI signaling, it may be determined that the repetitive transmission of the NPDCCH is to be terminated at a fourth DL subframe in a duration indicated by R_max=8. Accordingly, the NB UE may not need to perform monitoring for an NPDCCH in a subframe subsequent to the subframe where the repetitive transmission of an NPDCCH is terminated. The NB eNB terminates scheduling early with respect to the single NB UE, and may attempt to perform scheduling with respect to another UE, thus improving overall system performance.

In a situation when the subframe(s) belonging to an NB-PRS occasion overlap the NPDCCH or NPDSCH transmission subframe(s), a UE may exclude any subframe in which the reception of an NB-PRS is not expected (i.e., a subframe in which the transmission of an NPDCCH is actually repeated (a subframe corresponding to R=4 in FIG. 27)).

According to a first exclusion scheme, the NB UE counts consecutive downlink subframes used for an NB-PRS by excluding a subframe in which NB-PRS transmission is not expected, and then determines which subframes belong to an NB-PRS occasion (particularly, an NB-PRS transmission window). That is, the NB-PRS occasion may be determined by counting only the subframes remaining after excluding the subframe(s) in which NB-PRS transmission is not expected. Accordingly, as shown in the example in FIG. 27, it may be expressed that the start point of the subframes belonging to the NB-PRS occasion is postponed for a period of time corresponding to the subframes in which the reception of an NB-PRS is not expected.

According to a second exclusion scheme, the NB UE may exclude a subframe in which transmission of an NB-PRS is not expected from the consecutive downlink subframes used for an NB-PRS. That is, the NB UE may first determine the set of subframes belonging to an NB-PRS occasion according to a repeat count (R) parameter and may next determine the number of downlink subframes for an NB-PRS configured by the NB eNB. The NB UE may then attempt to receive an NB-PRS in only the subframe(s) remaining after excluding a subframe in which the transmission of an NB-PRS is not expected from the set. In the example in FIG. 27, the first two DL subframes out of the 8 DL subframes indicated for an NB-PRS occasion (First PRS occasion #0 of FIG. 27) overlaps an NPDCCH repetitive transmission subframe, and thus, the reception of an NB-PRS is not expected. Accordingly, it is determined that the NB-PRS occasion is formed of the 6 DL subframes remaining after excluding the corresponding subframes.

The NB eNB transmits an NPDCCH in a subframe in which an NPDCCH is repeatedly transmitted (a subframe indicated by R=4 DCI Signaling in FIG. 27), and transmits an NB-PRS from a subsequent subframe.

When a subframe in which an NPDSCH scheduled through a previously received NPDCCH is transmitted overlaps subframes belonging to an NB-PRS occasion, the NB UE may expect to receive an NPDSCH, and the NB UE may not expect to receive an NB-PRS.

Additionally, in a subframe in which an NPDSCH is repeatedly transmitted and an NPDCCH SS for transmission/reception related to at least some or all of paging, SI, SC-PTM, and random access-related transmission is repeatedly transmitted, the NB UE may not expect to receive an NB-PRS. This may secure the UE to receive system information which is more important than the position measurement of the UE, and thus, the cell connection of the UE may be continuously maintained and secured.

For example, in the case of a single transmission block (TB) for transmission of an SI (excluding SIB1), when the NB-PRS occasion overlaps the SIB transmission, the NB eNB may not transmit an NB-PRS on the overlapping subframe, and the NB UE may not expect to receive the NB-PRS on the corresponding subframe.

Also, when an NPDCCH subframe for transmitting and receiving paging or random access-related transmission (e.g., an RAR, an Msg3 retransmission message, an Msg4, or the like) overlaps the subframes included in the NB-PRS occasion, the NB UE may not expect to receive an NB-PRS on the corresponding subframe.

Figure 28:
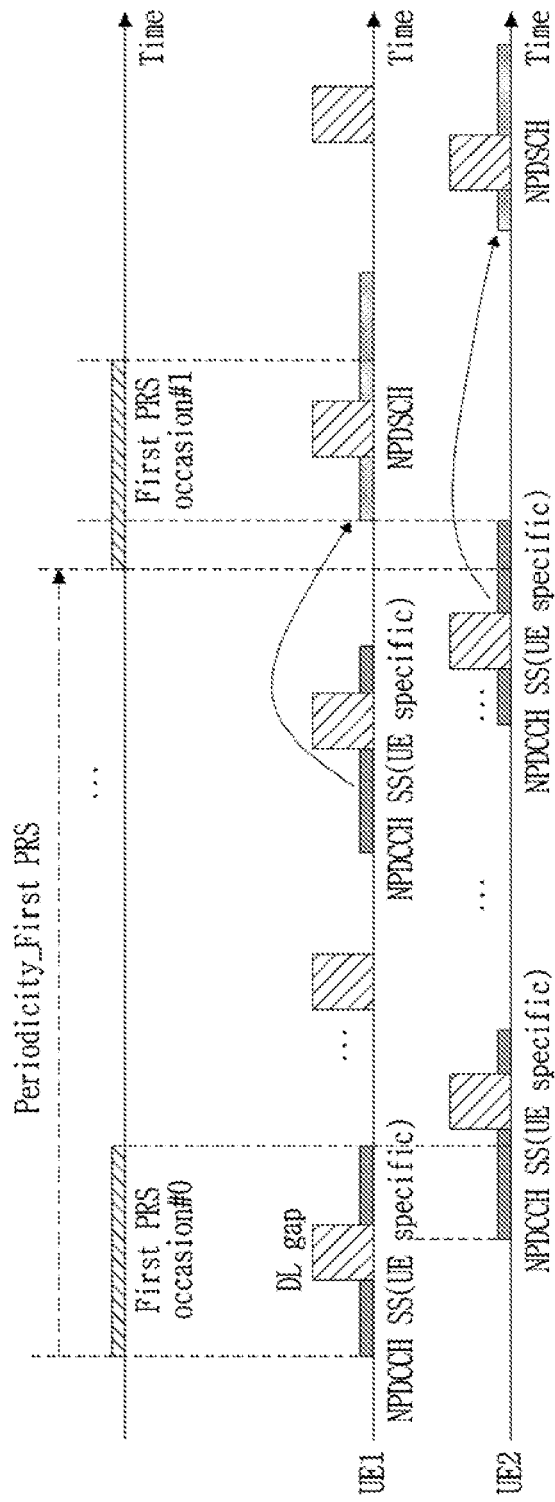
FIG. 28 is a diagram illustrating an NB-PRS subframe that overlaps an NB channel and a downlink gap.

FIG. 28 is a diagram illustrating an NB-PRS subframe that overlaps an NB channel and a downlink gap.

The example shown in FIG. 28 illustrates the case in which an NB-PRS occasion configured for a UE overlaps a downlink gap (DL gap) that is configured to allow the transmission and reception of an NPDCCH, NPDSCH, and/or Narrowband PUSCH (NPUSCH) of another UE during a UE's NB transmission (First PRS occasion of FIG. 28).

In this instance, when the NB-PRS occasion configured for the NB UE overlaps a downlink gap for another UE, the NB UE may not expect to receive an NB-PRS. An NB-PRS subframe is not counted as an NB-PRS subframe in the overlapping interval, and the transmission may be postponed to a subsequent valid NB-PRS subframe that does not overlap.

Next, a new downlink gap defined in an NB-PRS occasion will be described.

The downlink gap considered in the examples described above is for an NPDCCH and an NPDSCH. In addition, a new downlink gap may be configured in an NB-PRS occasion. This may be referred to as NB-PRS_DL Gap. The additional NB-PRS_DL Gap may be employed to secure the transmission occasion of another UE that requires urgent data scheduling, in the middle of an NB-PRS occasion that allows repetitive transmission on subframes.

NB-PRS_DL Gap, which is configured in the NB-PRS occasion, may be configured for an NB UE through higher layer signaling. When a threshold value is set for a maximum NPDCCH repetitive transmission configuration that implies a coverage environment, and a maximum NPDCCH repetitive transmission configuration exists that exceeds the corresponding threshold value, NB-PRS_DL Gap may be configured. When the maximum NPDCCH repetitive transmission configuration is less than or equal to the corresponding threshold value, NB-PRS_DL Gap may not be configured.

As described in one or more examples, when a subframe in which the NB UE does not expect NB-PRS transmission is determined, the NB UE may determine a NB-PRS transmission subframe by applying a first exclusion scheme or a second exclusion scheme.

According to the first exclusion scheme, when a subframe in which the NB UE does not expect NB-PRS transmission is determined, the NB UE first counts consecutive downlink subframes used for an NB-PRS by excluding the determined subframe, and then determines subframes belonging to the NB-PRS occasion (particularly, an NB-PRS transmission window). That is, the NB-PRS occasion may be determined by counting the subframes remaining after excluding the subframe in which NB-PRS transmission is not expected.

According to the second exclusion scheme, when a subframe in which the NB UE does not expect NB-PRS transmission is determined, the NB UE may exclude the determined subframe from the consecutive downlink subframes used for an NB-PRS. That is, the NB UE may determine the set of subframes belonging to the NB-PRS occasion according to both a repeat count (R) parameter and the number of downlink subframes for an NB-PRS configured by the NB eNB. Then the NB UE may attempt to receive an NB-PRS in the subframe(s) remaining after excluding from the set a subframe in which the transmission of an NB-PRS is not expected.

In this instance, a threshold value associated with the number of subframes in which an NB-PRS is not received may be set for the NB UE. Accordingly, when the number of NB-PRS subframes in which the NB UE does not receive an NB-PRS (or does not expect to receive an NB-PRS) in a single NB-PRS occasion exceeds a predetermined threshold value, the NB UE determines that the value calculated based on NB-PRSs received in the corresponding NB-PRS occasion is invalid. Therefore, the value may not be used for generating positioning information.

FIG. 29 is a flowchart illustrating first PRS transmission and reception operations.

In operation S2910, an eNB determines the configuration of a first PRS (e.g., NB-PRS) to be transmitted to a UE. The configuration of the first PRS may include an RE pattern in a first PRS transmission subframe, a first PRS sequence, a first PRS transmission PRB configuration, a first PRS transmission subframe configuration, a first PRS antenna port configuration, and the like, as described in one or more examples. In operation S2910, the eNB determines the configuration of a second PRS (e.g., LTE PRS) to be transmitted to the UE. The configuration of the LTE PRS may include an RE pattern in a second PRS transmission subframe, a second PRS sequence, a second PRS transmission PRB configuration, a second PRS transmission subframe configuration, a second PRS antenna port configuration, and the like.

In operation S2920, the eNB provides the UE with the first PRS configuration-related information and the second PRS configuration-related information, which are determined in operation S2910. The first PRS configuration-related information and the second PRS configuration-related information may be provided to the UE through separate signaling. The first PRS configuration-related information and the second PRS configuration-related information may be provided to the UE at the same time, or may be provided to the user at different points in time. The parts of the first PRS configuration-related information may be provided through one or more signalings, and the parts of the second PRS configuration-related information may also be provided through one or more signaling.

In operation S2930, the eNB transmits a first PRS and a second PRS to the UE. One or both of a time resource and a frequency resource in which the first PRS is transmitted may overlap one or both of a time resource and a frequency resource in which the second PRS is transmitted. Alternatively, the first and second PRSs may be transmitted in different time-frequency resources (i.e., not overlapping time-frequency resources). The UE may attempt to receive the first PRS and the second PRS based on the first and second PRS configuration information received in operation S2920.

In operation S2940, the UE may generate positioning information (e.g., information used for determining the location of the UE itself, such as an RSTD) using the first PRS received from the eNB, may generate positioning information using the second PRS, or may generate positioning information using both the first and second PRSs. When the time-frequency resources in which the first PRS is transmitted overlap the time-frequency resources in which the second PRS is transmitted, the UE may use only the second PRS in the overlapping time-frequency resources to generate positioning information. When the time-frequency resources in which the first PRS is transmitted do not overlap the time-frequency resources in which the second PRS is transmitted, the UE may use only the first PRS to generate positioning information, may use only the second PRS to generate positioning information, or may use both the first and second PRSs to generate positioning information.

In operation S2950, the UE transmits the positioning information generated in operation S2940 to the eNB or to an NB-IoT server (or location server) via the eNB.

Although the above described illustrative methods are expressed as a series of operations for ease of description, they may not limit the order of operations executed, and the operations may be executed in parallel or in a different order. Also, one or more of the operations described above may be omitted in some implementations.

An NB UE may process a positioning reference signal by performing one or more operations below. The NB UE receives positioning reference signal (PRS) configuration information, determine narrowband PRS (NB PRS) configuration information for the NB UE, the NB PRS configuration information comprising information of an NB PRS reference cell that generates an NB PRS for the NB UE; and determine PRS configuration information for a UE, the UE being assigned to use a frequency band unavailable for the NB UE, and the PRS configuration information comprising information of a PRS reference cell that generates a PRS for the UE. The NB UE may generate, based on the NB PRS configuration information and the PRS configuration information, a reference signal time difference (RSTD) measurement, and transmit the RSTD measurement.

The UE may be an LTE UE capable of processing a plurality of physical resource blocks not available for the NB UE.

The NB UE may determine a first NB PRS mapped in one physical resource block (PRB) and transmitted from the NB PRS reference cell, and determine a portion of a first PRS mapped in the one PRB and transmitted from the PRS reference cell, wherein the first PRS mapped in a plurality of PRBs. The RSTD measurement may be generated based on the first NB PRS and the portion of the first PRS.

The NB UE may determine a second NB PRS mapped in the one PRB and transmitted from an NB PRS neighbor cell and determine a portion of a second PRS mapped in the one PRB and transmitted from a PRS neighbor cell, wherein the second PRS mapped in the plurality of PRBs. The NB UE may calculate, based on a receipt time difference between the first NB PRS and the second NB PRS and between the portion of the first PRS and the portion of the second PRS, a first RSTD.

The NB UE may determine a third NB PRS mapped in the one PRB and transmitted from a second NB PRS neighbor cell and a portion of a third PRS mapped in the one PRB and transmitted from a second PRS neighbor cell, wherein the third PRS mapped in the plurality of PRBs. The NB UE may calculate, based on a receipt time difference between the first NB PRS and the third NB PRS and between the portion of the first PRS and the portion of the third PRS, a second RSTD.

The RSTD measurement may be generated based on the first RSTD and the second RSTD.

The NB UE may be assigned to use a frequency band corresponding to one physical resource block (PRB), and the UE is assigned to use a frequency band corresponding to a plurality of PRBs, the plurality of PRBs comprising the one PRB.

A more advance NB UE may be assigned to use two PRBs or three PRBs or the like. However, an NB UE is not capable of using all LTE frequency bands available for an LTE UE.

The NB UE may receive physical resource block (PRB) index indicating the one PRB and determine, based on the received PRB index, the NB PRS mapped in the one PRB and a portion of the PRS mapped in the one PRB.

The NB UE may receive, from the NB PRS reference cell, an NB PRS mapped in one physical resource block (PRB). The NB PRS may be configured to be mapped in a subframe in which narrowband physical broadcasting channel (NPBCH), narrowband primary synchronization signal (NPSS), narrowband secondary synchronization signal (NSSS), or System Information Block type 1 (SIB1).

An NB UE may determine NB positioning reference signal (PRS) configuration information for the NB UE, the NB PRS configuration information comprising information of an NB PRS reference cell that generates an NB PRS for the NB UE, receive the NB PRS for the NB UE, and receive a PRS for a UE, the UE being assigned to use a first frequency band available for the NB UE and a second frequency band unavailable for the NB UE. The NB UE may generate, based on the NB PRS and the PRS, a reference signal time difference (RSTD) measurement and transmit the RSTD measurement.

The NB UE may determine the same antenna port of the NB UE to receive the NB PRS and the PRS.

The PRS may be generated based on a Long-Term Evolution (LTE) protocol (including LTE-Advanced protocol). The first frequency band may correspond to one physical resource block (PRB) available for the NB UE, and the second frequency band may correspond to a plurality of PRBs unavailable for the NB UE.

The NB PRS configuration information may be received via a Long-Term Evolution Positioning Protocol (LPP) signaling layer.

Some portion of the NB PRS and some portion of the PRS mapped in the first frequency band are transmitted in the same subframe. Some portion of the NB PRS is transmitted in a subframe in which the PRS is not transmitted.

The NB PRS configuration information may include a physical resource block (PRB) index that indicates the first frequency band in which the NB PRS and a portion of the PRS are mapped.

A network including a base station may process a PRS. The network may transmit, to a narrow-band (NB) user equipment (UE), narrowband PRS (NB PRS) configuration information for the NB UE, the NB PRS configuration information comprising information of an NB PRS reference cell that generates an NB PRS for the NB UE, and transmit, to the NB UE, PRS configuration information for a UE, the UE being assigned to use a frequency band unavailable for the NB UE, and the PRS configuration information comprising information of a PRS reference cell that generates a PRS for the UE. The base station may transmit, to the NB UE, an NB PRS for the NB UE. The base station may transmit a PRS for a UE, the UE being assigned to use a first frequency band available for the NB UE and a second frequency band unavailable for the NB UE. Although the PRS is generally targeted for one or more UEs. A portion of the PRS may be received and processed by one or more NB UEs. The network may receive, from the NB UE, a reference signal time difference (RSTD) measurement, the RSTD measurement being based on the NB PRS and the PRS associated with the first frequency band.

The NB PRS and the PRS may be transmitted by using a same antenna port of the base station. The NB PRS configuration information and the PRS configuration information may be generated by an Evolved-Serving Mobile Location Centre (E-SMLC).

The NB PRS configuration information may include a number of Cell-specific Reference Signal (CRS) ports and an NB reference cell ID corresponding to a reference cell ID of the base station.

The NB PRS configuration information may include a physical resource block (PRB) index that indicates the first frequency band in which the NB PRS and a portion of the PRS are mapped.

FIG. 30 is a diagram illustrating the configuration of a processor for a wireless device.

The processor 210 of the eNB 200 may be configured to implement the operations of an eNB described herein.

For example, the higher layer processing unit 211 of the processor 210 of the eNB 200 may include a first-and-second-PRS configuration generating unit 3040 and a first-and-second-PRS configuration-related information generating unit 3050.

The first-and-second PRS configuration determining unit 3040 may determine an RE pattern in a first PRS transmission subframe, a first PRS sequence, a first PRS transmission PRB configuration, a first PRS transmission subframe configuration, a first PRS antenna port configuration, and the like. The first-and-second PRS configuration determining unit may also determine an RE pattern in a second PRS transmission subframe, a second PRS sequence, a second PRS transmission PRB configuration, a second PRS transmission subframe configuration, a second PRS antenna port configuration, and the like. According to the first PRS configuration and second PRS configuration determined as described above, the first-and-second-PRS configuration-related information generating unit 3050 may generate signaling information in a format separately determined in advance for a first PRS and a second PRS, and may transmit the same to a UE through the physical layer processing unit 212. For example, the first PRS configuration-related information and the second PRS configuration-related information may be provided to the UE through separate signaling. Also, the first PRS configuration-related information and the second PRS configuration-related information may be provided to the UE at the same time, or may be provided to the user at different points in time. Also, the parts of the first PRS configuration-related information may be provided through one or more signaling operations, and the parts of the second PRS configuration-related information may also be provided through one or more signaling operations.

The physical layer processing unit 212 of the processor 210 of the eNB 200 may include a first-and-second-PRS transmitting unit 3060. The first-and-second-PRS transmitting unit 3060 may map the first PRS and the second PRS onto physical resources respectively allocated thereto according to the first PRS configuration and the second PRS configuration, and may transmit the same to the UE 100. For example, one or both of a time resource and a frequency resource in which the first PRS is transmitted may overlap one or both of a time resource and a frequency resource in which the second PRS is transmitted. Alternatively, the first and second PRSs may be transmitted in different time-frequency resources (i.e., not overlapping time-frequency resources).

The processor 110 of the UE 100 may be configured to implement the operations of a UE described herein.

For example, the higher layer processing unit 111 of the processor 110 of the UE 100 may include a first-and-second-PRS configuration determining unit 3010 and a positioning information generating unit 3020. The physical layer processing unit 112 of the processor 110 of the UE 100 may include a first-and-second-PRS receiving unit 3030.

The first-and-second-PRS configuration determining unit 3010 may determine an RE pattern in a transmission subframe, a sequence, a transmission PRB configuration, a transmission subframe configuration, an antenna port configuration, and the like for each of a first PRS and a second PRS, based on first PRS configuration-related information and second PRS configuration-related information provided from the eNB 200.

The first-and-second-PRS receiving unit 3030 may receive a first PRS and a second PRS using physical resources based on the determined first PRS configuration and the second PRS configuration.

The positioning information generating unit 3020 may generate positioning information based on one or more out of the received first PRS and second PRS, and may transmit the same to an eNB or a network-side server through the physical layer processing unit 112.

The descriptions provided through one or more examples may be applied to the operations of the UE 100 and the eNB, and repetitive descriptions will be omitted.

Although various examples of the present disclosure have been described from the perspective of the 3GPP LTE or LTE-A system, they may be applied to other various mobile communication systems.

What is claimed is:

1. A first wireless device comprising:
a wireless transceiver configured to:
receive first information associated with positioning reference signaling and second information associated with narrow-band (NB) positioning reference signaling; and
transmit a reference signal time difference (RSTD) measurement;
one or more processors; and
memory storing instructions that, when executed by the one or more processors, cause the first wireless device to:
determine, based on the first information, positioning reference signal (PRS) information for one or more wireless user devices, wherein the one or more wireless user devices are capable of using a frequency baud not configured for the first wireless device, wherein the PRS information comprises information of a PRS reference cell that transmits a PRS for the one or more wireless user devices, and wherein a portion of the PRS for the one or more wireless user devices is transmitted in a frequency band configured for the first wireless device;
determine, based on the second information, NB PRS information for the first wireless device, wherein the NB PRS information comprises information of an NB PRS reference cell that transmits an NB PRS for the first wireless device; and
determine, based on the NB PRS for the first wireless device and based on the portion of the PRS for the one or more wireless user devices, the RSTD measurement.

2. The first wireless device of chum 1, wherein the instructions, when executed by the one or more processors, cause the first wireless device to:
determine one or more of:
a second NB PRS transmitted from an NB PRS neighbor cell; or
a portion of a second PRS transmitted from a PRS neighbor cell; and
determine, based on the one or more of the second NB PRS or the second PRS, the RSTD measurement or a second RSTD measurement.

3. The first wireless device of claim 2, wherein the instructions, when executed by the one or more processors, cause the first wireless device to:
determine one or more of:
a third NB PRS transmitted from a second NB PRS neighbor cell; or
a third PRS transmitted from a second PRS neighbor cell; and
determine, based on the one or more of the third NB PRS or the third PRS, the second RSTD measurement or a third RSTD measurement.

4. The first wireless device of claim 3, wherein the second RSTD measurement or the third RSTD measurement is further based on one or more of:
the portion of the PRS for the one or more wireless user devices;
the second NB PRS; or
the portion of the second PRS.

5. The first wireless device of claim 1, wherein a frequency band corresponding to one physical resource block (PRB) is assigned for the first wireless device, wherein a frequency band corresponding to a plurality of PRBs is assigned for the one or more wireless user devices, and wherein the plurality of PRBs comprises the one PRB.

6. The first wireless device of claim 5, wherein the instructions, when executed by the one or more processors, cause the first wireless device to:
   determine a physical resource block (PRB) index indicating the one PRB; and
   determine, based on the PRB index, the NB PRS for the first wireless device and the portion of the PRS for the one or more wireless user devices.

7. The first wireless device of claim 1, wherein the wireless transceiver is configured to receive, from the NB PRS reference cell, the NB PRS that is mapped in one physical resource block (PRB), and
   wherein the NB PRS is mapped in a subframe in which narrowband physical broadcasting channel (NPBCH), narrowband primary synchronization signal (NPSS), narrowband secondary synchronization signal (NSSS), or System information Block type 1 (SIB1) is not allocated.

8. The first wireless device of claim 1, wherein the PRS reference cell and the NB PRS reference cell correspond to a same cell.

9. The first wireless device of claim 1, wherein the PRS for the one or more wireless user devices comprises a Long-Term Evolution (LTE) PRS for the one or more wireless user devices.

10. A narrow-band (NB) wireless device comprising:
    a wireless transceiver configured to:
       receive first information associated with positioning reference signaling and second information associated with NB positioning reference signaling;
       receive an NB positioning reference signal (PRS) for the NB wireless device; and
       receive a PRS for one or more wireless user devices; and
       transmit a reference signal time difference (RSTD) measurement;
    one or more processors; and
    memory storing instructions that, when executed by the one or more processors, cause the NB wireless device to:
       determine, based on the second information, the NB PRS for the NB wireless device;
       determine, based on the first information, the PRS for the one or more wireless user devices; and
       determine, based on the NB PRS for the NB wireless device and the PRS for the one or more wireless user devices, the RSTD measurement.

11. The NB wireless device of claim 10, wherein the instructions, when executed by the one or more processors, cause the NB wireless device to:
    determine, based on the first information, information of a PRS reference cell that transmits the PRS for the one or more wireless user devices.

12. The NB wireless device of claim 10, wherein the instructions, when executed by the one or more processors, cause the NB wireless device to:
    determine one or more antenna ports of the NB wireless device to receive the NB PRS for the NB wireless device and the PRS for the one or more wireless user devices.

13. The NB wireless device of claim 10, wherein the PRS is according to a Long-Term Evolution (LTE) protocol, and
    wherein a frequency band corresponding to a plurality of PRBs that is configured for the one or more wireless user devices is not configured for the NB wireless device.

14. The NB wireless device of claim 13, wherein the one or more wireless use devices comprises:
    the NB wireless device; and
    at least one wireless device configured with the frequency band corresponding to the plurality of PRBs.

15. The NB wireless device of claim 10, wherein the NB PRS and the PRS are mapped in a first frequency band and are transmitted in a subframe.

16. The NB wireless device of claim 10, wherein the NB PRS is transmitted in a subframe in which the PRS is not transmitted.

17. The NB wireless device of claim 10, wherein the second information comprises:
    a physical resource block (PRB) index that indicates a first frequency band in which the NB PRS and the PRS are mapped.

* * * * *